US012743465B2

(12) United States Patent
Yu et al.

(10) Patent No.: US 12,743,465 B2
(45) Date of Patent: Sep. 22, 2026

(54) GENERATING TEMPORAL SEQUENCES USING DIFFUSION TRANSFORMER NEURAL NETWORKS

(71) Applicant: Google LLC, Mountain View, CA (US)

(72) Inventors: Sihyun Yu, Seongnam-si (KR); Meera Satya Hahn, Atlanta, GA (US); Agrim Gupta, Stanford, CA (US); José Lezama Torres de la Llosa, Atlanta, GA (US); Irfan Aziz Essa, Atlanta, GA (US); David A. Ross, San Jose, CA (US); Jonathan Huang, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/216,518

(22) Filed: May 22, 2025

(65) Prior Publication Data

US 2025/0363171 A1 Nov. 27, 2025

Related U.S. Application Data

(60) Provisional application No. 63/650,862, filed on May 22, 2024.

(51) Int. Cl.
*G06F 16/00* (2019.01)
*G06F 16/74* (2019.01)
*G06N 3/09* (2023.01)

(52) U.S. Cl.
CPC ............. *G06F 16/743* (2019.01); *G06N 3/09* (2023.01)

(58) Field of Classification Search
CPC ...... G06F 16/743; G06N 3/09; G06N 3/0475; G06N 3/045; G06T 5/60; G06T 5/70; G06T 11/00
See application file for complete search history.

(56) References Cited

U.S. PATENT DOCUMENTS

2023/0326195 A1* 10/2023 Venkataramanan ... G06V 10/25 382/157
2025/0193423 A1* 6/2025 Li ........................ H04N 19/172
2025/0252627 A1* 8/2025 Park ........................ G06T 11/60

OTHER PUBLICATIONS

Guo, "Latent Variable Algorithms for Multimodal Learning and Sensor Fusion",Apr. 23, 2019,Department of Intelligent Systems Engineering Indiana University,pp. 1-37 (Year: 2019).*

(Continued)

*Primary Examiner* — Alexander Khong
(74) *Attorney, Agent, or Firm* — Fish & Richardson P.C.

(57) ABSTRACT

Methods, systems, and apparatus, including computer programs encoded on a computer storage medium, for generating an output temporal sequence of data elements conditioned on an input. In one aspect, a method comprises: obtaining the input, wherein the input comprises a noise input comprising a respective latent representation for each of a plurality of segments of the temporal sequence; updating, for each segment, the latent representation for the segment using a latent denoising neural network, the updating comprising, for each segment other than the first segment: obtaining a memory vector representing one or more hidden states generated by the latent denoising neural network when updating the latent representations for one or more preceding segments; updating the latent representation for the segment at each of a plurality of iterations; and generating the output temporal sequence of data elements by processing the latent representations for the plurality of segments.

20 Claims, 8 Drawing Sheets

(56) References Cited

OTHER PUBLICATIONS

Acharya, "Towards High Resolution Video Generation with Progressive Growing of Sliced Wasserstein GANs," CoRR, Submitted Oct. 4, 2018, arXiv:1810.02419v1, 57 pages.
Adnan et al., "Keyformer: KV Cache Reduction through Key Tokens Selection for Efficient Generative Inference," CoRR, Submitted Mar. 14, 2024, arXiv:2403.09054v1, 19 pages.
An et al., "Latent-Shift: Latent Diffusion with Temporal Shift for Efficient Text-to-Video Generation," CoRR, Submitted Apr. 17, 2023, arXiv:2304.08477v1, 14 pages.
Babaeizadeh et al., "Stochastic Variational Video Prediction," Paper, Presented at the Proceedings of the International Conference on Learning Representations, Vancouver, Canada, Apr. 30-May 3, 2018, 15 pages.
Bar-Tal et al., "Lumiere: A Space-Time Diffusion Model for Video Generation," CoRR, Submitted Jan. 23, 2024, arXiv:2401.12945v1, 18 pages.
Beltagy et al., "Longformer: The Long-Document Transformer," CoRR, Submitted Apr. 10, 2020, arXiv:2004.05150v1, 14 pages.
Bertasius et al., "Is Space-Time Attention All You Need for Video Understanding?," Paper, Presented at the Proceedings of the International Conference on Machine Learning, Virtual Conference, Jul. 18-24, 2021; PMLR, Apr. 2021, 139, 12 pages.
Bessonov et al., "Recurrent Memory Decision Transformer," CoRR, Submitted Jun. 15, 2023, arXiv:2306.09459v1, 13 pages.
Blattmann et al., "Align Your Latents: High-Resolution Video Synthesis with Latent Diffusion Models," Paper, Presented at the Proceedings of the IEEE/CVF Conference: Computer Vision and Pattern Recognition, Vancouver, Canada, Jun. 17-24, 2023, pp. 22563-22575 (Author Manuscript).
Brooks et al., "InstructPix2Pix: Learning to Follow Image Editing Instructions," Paper, Presented at the Proceedings of the IEEE/CVF Conference: Computer Vision and Pattern Recognition, Vancouver, Canada, Jun. 17-24, 2023, pp. 18392-18402 (Author Manuscript).
Bulatov et al., "Beyond Attention: Breaking the Limits of Transformer Context Length with Recurrent Memory," Paper, Presented at The Thirty-Eighth AAAI Conference on Artificial Intelligence (AAAI-24), Vancouver, Canada, Feb. 20-27, 2024, 38(16):17700-17708.
Bulatov et al., "Recurrent Memory Transformer," Paper, Presented at the 36th Conference on Neural Information Processing Systems, New Orleans, Louisiana, Nov. 28-Dec. 9, 2022; Advances in Neural Information Processing Systems, Dec. 2022, 35, 13 pages.
Chang et al., "MaskGIT: Masked Generative Image Transformer," Paper, Presented at the Proceedings of the IEEE/CVF Conference: Computer Vision and Pattern Recognition, New Orleans, Louisiana, Jun. 18-24, 2022, pp. 11315-11325 (Author Manuscript).
Chen et al., "Pixart-$\alpha$: Fast Training of Diffusion Transformer for Photorealistic Text-to-image Synthesis," Paper, Presented at the Proceedings of the International Conference on Learning Representations, Vienna, Austria, May 7-11, 2024, 30 pages.
Choromanski et al., "Rethinking Attention with Performers," CoRR, Submitted Sep. 30, 2020, arXiv:2009.14794v1, 36 pages.
Clark et al., "Adversarial Video Generation on Complex Datasets," CoRR, Submitted Sep. 25, 2019, arXiv:1907.06571v2, 21 pages.
Dai et al., "Transformer-XL: Attentive Language Models beyond a Fixed-Length Context," Paper, Presented at the Proceedings of the 57th Annual Meeting of the Association for Computational Linguistics, Florence, Italy, Jul. 28-Aug. 2, 2019, pp. 2978-2988.
Dao et al., "FLASHATTENTION: Fast and Memory-Efficient Exact Attention with IO-Awareness," Paper, Presented at the 36th Conference on Neural Information Processing Systems, New Orleans, Louisiana, Nov. 28-Dec. 9, 2022; Advances in Neural Information Processing Systems, Dec. 2022, 35, 16 pages.
Deepmind.google [online], "Veo: Our most capable generative video model," available on or before May 14, 2024, via Internet Archive: Wayback Machine URL <https://web.archive.org/web/20240514182533/https://deepmind.google/technologies/veo/>, retrieved on Sep. 3, 2025, retrieved from URL <https://deepmind.google/models/veo/>, 13 pages.
Denton et al., "Stochastic Video Generation with a Learned Prior," Paper, Presented at the Proceedings of the International Conference on Machine Learning, Stockholm, Sweden, Jul. 10-15, 2018; PMLR, 2018, 80, 10 pages.
Denton et al., "Unsupervised Learning of Disentangled Representations from Video," Paper, Presented at the 31st Conference on Neural Information Processing Systems, Long Beach, California, Dec. 4-9, 2017; Advances in Neural Information Processing Systems, Dec. 2017, 30, 10 pages.
Devlin et al., "BERT: Pre-training of Deep Bidirectional Transformers for Language Understanding," CoRR, Submitted Oct. 11, 2018, arXiv:1810.04805v1, 14 pages.
Dhariwal et al., "Diffusion Models Beat GANs on Image Synthesis," Paper, Presented at the 35th Conference on Neural Information Processing Systems, Virtual Event, Dec. 6-14, 2021; Advances in Neural Information Processing Systems, Dec. 2021, 34, 15 pages.
Dosovitskiy et al., "An Image is Worth 16×16 Words: Transformers for Image Recognition at Scale," CoRR, Submitted Oct. 22, 2020, arXiv:2010.11929v1, 21 pages.
Finn et al., "Unsupervised Learning for Physical Interaction through Video Prediction," Paper, Presented at the 30th Conference on Neural Information Processing Systems, Barcelona, Spain, Dec. 5-10, 2016; Advances in Neural Information Processing Systems, Dec. 2016, 29, 9 pages.
Fox et al., "StyleVideoGAN: A Temporal Generative Model using a Pretrained StyleGAN," CoRR, Submitted Jul. 15, 2021, arXiv:2107.07224v1, 18 pages.
Franceschi et al., "Stochastic Latent Residual Video Prediction," Paper, Presented at the Proceedings of the International Conference on Machine Learning, Virtual Event, Jul. 13-18, 2020; PMLR, Mar. 2020, 119, 14 pages.
Ge et al., "Long Video Generation with Time-Agnostic VQGAN and Time-Sensitive Transformer," CoRR, Submitted Apr. 7, 2022, arXiv:2204.03638v1, 28 pages.
Ge et al., "Long Video Generation with Time-Agnostic VQGAN and Time-Sensitive Transformer," Paper, Presented at the Proceedings of the European Conference on Computer Vision, Tel Aviv, Israel, Oct. 23-27, 2022; LNCS, 2022, 13677:102-118.
Ge et al., "Preserve Your Own Correlation: A Noise Prior for Video Diffusion Models," Paper, Presented at the 2023 IEEE/CVF International Conference on Computer Vision (ICCV), Paris, France, Oct. 1-6, 2023, pp. 22930-22941 (Author Manuscript).
Goodfellow et al., "Generative Adversarial Nets," Paper, Presented at the 28th Conference on Neural Information Processing Systems, Montreal, Canada, Dec. 8-13, 2014; Advances in Neural Information Processing Systems, Dec. 2014, 27, 9 pages.
Gordon et al., "Latent Neural Differential Equations for Video Generation," Paper, Presented at the NeurIPS 2020 Workshop on Pre-registration in Machine Learning, Virtual, Dec. 11, 2020, PMLR, 2021, 148:73-86.
Guera et al., "Deepfake Video Detection Using Recurrent Neural Networks," Paper, Presented at the 2018 15th IEEE International Conference on Advanced Video and Signal Based Surveillance (AVSS), Auckland, New Zealand, Nov. 27-30, 2018, pp. 1-6.
Gupta et al., "Photorealistic Video Generation with Diffusion Models," CoRR, Submitted Dec. 11, 2023, arXiv:2312.06662v1, 13 pages.
Harvey et al., "Flexible Diffusion Modeling of Long Videos," CoRR, Submitted May 23, 2022, arXiv:2205.11495v1, 17 pages.
Harvey et al., "Flexible Diffusion Modeling of Long Videos," Paper, Presented at the 36th Conference on Neural Information Processing Systems, New Orleans, Louisiana, Nov. 28-Dec. 9, 2022; Advances in Neural Information Processing Systems, Dec. 2022, 35, 13 pages.
Hawthorne et al., "General-purpose, long-context autoregressive modeling with Perceiver AR," Paper, Presented at the Proceedings of the International Conference on Machine Learning, Baltimore, Maryland, Jul. 17-23, 2022; PMLR, 2022, 162, 24 pages.
He et al., "Latent Video Diffusion Models for High-Fidelity Long Video Generation," CoRR, Submitted Mar. 20, 2023, arXiv:2211.13221v2, 10 pages.

(56) References Cited

OTHER PUBLICATIONS

He et al., "Latent Video Diffusion Models for High-Fidelity Video Generation with Arbitrary Lengths," CoRR, Submitted Nov. 23, 2022, arXiv:2211.13221v1, 10 pages.
Ho et al., "Denoising Diffusion Probabilistic Models," Paper, Presented at the 34th Conference on Neural Information Processing Systems, Virtual Event, Dec. 6-12, 2020; Advances in Neural Information Processing Systems, Dec. 2020, 33, 12 pages.
Ho et al., "Imagen Video: High Definition Video Generation with Diffusion Models," CoRR, Submitted Oct. 5, 2022, arXiv:2210.02303v1, 18 pages.
Ho et al., "Video Diffusion Models," Paper, Presented at the 36th Conference on Neural Information Processing Systems, New Orleans, Louisiana, Nov. 28-Dec. 9, 2022; Advances in Neural Information Processing Systems, Dec. 2022, 35, 14 pages.
Hoppe et al., "Diffusion Models for Video Prediction and Infilling," Transactions on Machine Learning Research, Nov. 2022, 22 pages.
Hu et al., "LoRA: Low-Rank Adaptation of Large Language Models," CoRR, Submitted Jun. 17, 2021, arXiv:2106.09685v1, 20 pages.
Huang et al., "Video Generation Beyond a Single Clip," CoRR, Submitted Apr. 15, 2023, arXiv:2304.07483v1, 10 pages.
Hutchins et al., "Block-Recurrent Transformers," Paper, Presented at the 36th Conference on Neural Information Processing Systems, New Orleans, Louisiana, Nov. 28-Dec. 9, 2022; Advances in Neural Information Processing Systems, Dec. 2022, 35, 14 pages.
Kahembwe et al., "Lower dimensional kernels for video discriminators," Neural Networks, Dec. 2020, 132:506-520.
Kalchbrenner et al., "Video Pixel Networks," Paper, Presented at the Proceedings of the International Conference on Machine Learning, Sydney, Australia, Aug. 6-11, 2017; PMLR, 2017, 70, 9 pages.
Karras et al., "Analyzing and Improving the Image Quality of StyleGAN, " Paper, Presented at the Proceedings of the IEEE/CVF Conference: Computer Vision and Pattern Recognition, Seattle, Washington, Jun. 13-19, 2020, pp. 8110-8119 (Author Manuscript).
Karras et al., "Elucidating the Design Space of Diffusion-Based Generative Models," Paper, Presented at the 36th Conference on Neural Information Processing Systems, New Orleans, Louisiana, Nov. 28-Dec. 9, 2022; Advances in Neural Information Processing Systems, Dec. 2022, 35, 13 pages.
Kay et al., "The Kinetics Human Action Video Dataset," CoRR, Submitted May 19, 2017, arXiv:1705.06950v1, 22 pages.
Kim et al., "Hybrid Video Diffusion Models with 2D Triplane and 3D Wavelet Representation," CoRR, Submitted Feb. 21, 2024, arXiv:2402.13729v1, 17 pages.
Kim et al., "Scalable Neural Video Representations with Learnable Positional Features," Paper, Presented at the 36th Conference on Neural Information Processing Systems, New Orleans, Louisiana, Nov. 28-Dec. 9, 2022; Advances in Neural Information Processing Systems, Dec. 2022, 35, 14 pages.
Kitaev et al., "Reformer: The Efficient Transformer," Paper, Presented at the Proceedings of the International Conference on Learning Representations, Virtual Event, Apr. 26-May 1, 2020, 12 pages.
Kondratyuk et al., "VideoPoet: A Large Language Model for Zero-Shot Video Generation," CoRR, Submitted Dec. 21, 2023, arXiv:2312.14125v1, 20 pages.
Kong et al., "Autoregressive Diffusion Model for Graph Generation," Paper, Presented at the Proceedings of the International Conference on Machine Learning, Honolulu, Hawaii, Jul. 23-29, 2023; PMLR, 2023, 202, 18 pages.
Kong et al., "DiffWave: A Versatile Diffusion Model for Audio Synthesis," Paper, Presented at the Proceedings of the International Conference on Learning Representations, Virtual Event, May 3-7, 2021, 17 pages.
Kumar et al., "VideoFlow: A Conditional Flow-Based Model for Stochastic Video Generation," Paper, Presented at the Proceedings of the International Conference on Learning Representations, Virtual Event, Apr. 26-May 1, 2020, 18 pages.
Lakhotia et al., "Generative Spoken Language Modeling from Raw Audio," CoRR, Submitted Feb. 1, 2021, arXiv:2102.01192v1, 22 pages.
Lee et al., "DreamFlow: High-quality text-to-3D generation by Approximating Probability Flow," Paper, Presented at the Proceedings of the International Conference on Learning Representations, Vienna, Austria, May 7-11, 2024, 26 pages.
Lee et al., "Revisiting Hierarchical Approach for Persistent Long-Term Video Prediction," Paper, Presented at the Proceedings of the International Conference on Learning Representations, Virtual Event, May 3-7, 2021, 27 pages.
Lee et al., "Stochastic Adversarial Video Prediction," CoRR, Submitted Apr. 4, 2018, arXiv:1804.01523v1, 26 pages.
Lippe et al., "PDE-Refiner: Achieving Accurate Long Rollouts with Neural PDE Solvers," Paper, Presented at Proceedings of the International Conference on Learning Representations, Kigali, Rwanda, May 1-5, 2023, 36 pages.
Liu et al., "Ring Attention with Blockwise Transformers for Near-Infinite Context," Paper, Presented at the 37th Conference on Neural Information Processing Systems (Foundation Models for Decision Making Workshop), New Orleans, Louisiana, Dec. 15, 2023, 15 pages.
Loshchilov et al., "Decoupled Weight Decay Regularization," Paper, Presented at the Proceedings of the International Conference on Learning Representations, New Orleans, Louisiana, May 6-9, 2019, 18 pages.
Lu et al., "Improve Temporal Consistency in Diffusion Models through Noise Correlations," Paper, Presented at the Proceedings of the International Conference on Learning Representations, Vienna, Austria, May 7-11, 2024, 16 pages.
Lu et al., "VDT: An Empirical Study on Video Diffusion with Transformers," CoRR, Submitted May 22, 2023, arXiv:2305.13311v1, 12 pages.
Lu et al., "VDT: General-purpose Video Diffusion Transformers via Mask Modeling," CoRR, Submitted Oct. 11, 2023, arXiv:2305.13311v2, 26 pages.
Luc et al., "Transformation-based Adversarial Video Prediction on Large-Scale Data," CoRR, Submitted Mar. 9, 2020, arXiv:2003.04035v1, 15 pages.
Luo et al., "Diffusion Probabilistic Models for 3D Point Cloud Generation," Paper, Presented at the Proceedings of the IEEE/CVF Conference: Computer Vision and Pattern Recognition, Nashville, Tennessee, Jun. 20-25, 2021, pp. 2837-2845 (Author Manuscript).
Ma et al., "Latte: Latent Diffusion Transformer for Video Generation," CoRR, Submitted Jan. 5, 2024, arXiv:2401.03048v1, 16 pages.
Meng et al., "SDEdit: Guided Image Synthesis and Editing with Stochastic Differential Equations," Paper, Presented at the Proceedings of the International Conference on Learning Representations, Virtual Event, Apr. 25-29, 2022, 33 pages.
Mitchell et al., "DetectGPT: Zero-Shot Machine-Generated Text Detection using Probability Curvature," Paper, Presented at the Proceedings of the International Conference on Machine Learning, Honolulu, Hawaii, Jul. 23-29, 2023; PMLR, 2023, 202, 13 pages.
Munoz et al., "Temporal Shift GAN for Large Scale Video Generation," Paper, Presented at the 2021 IEEE Winter Conference on Applications of Computer Vision (WACV), Waikoloa, Hawaii, Jan. 3-8, 2021, pp. 3179-3188 (Author Manuscript).
Openai.com [online], "Video generation models as world simulators," Feb. 2024, retrieved on Aug. 29, 2025, retrieved from URL <https://openai.com/index/video-generation-models-as-world-simulators/>, 50 pages.
Peebles et al., "Scalable Diffusion Models with Transformers," Paper, Presented at the 2023 IEEE/CVF International Conference on Computer Vision (ICCV), Paris, France, Oct. 1-6, 2023, pp. 4195-4205 (Author Manuscript).
Peng et al., "RWKV: Reinventing RNNs for the Transformer Era," CoRR, Submitted May 22, 2023, arXiv:2305.13048v1, 25 pages.
Pope et al., "Efficiently Scaling Transformer Inference," Paper, Presented at the Proceedings of the Sixth Conference on Machine Learning and Systems, MLSys 2023, Miami, Florida, Jun. 4-8, 2023, 5, 19 pages.

(56) References Cited

OTHER PUBLICATIONS

Raffel et al., "Exploring the Limits of Transfer Learning with a Unified Text-to-Text Transformer," CoRR, Submitted Oct. 23, 2019, arXiv:1910.10683v1, 52 pages.
Rakhimov et al., "Latent Video Transformer," CoRR, Submitted Jun. 18, 2020, arXiv:2006.10704v1, 18 pages.
Rombach et al., "High-Resolution Image Synthesis with Latent Diffusion Models," Paper, Presented at the Proceedings of the IEEE/CVF Conference: Computer Vision and Pattern Recognition, New Orleans, Louisiana, Jun. 18-24, 2022, pp. 10684-10695 (Author Manuscript).
Ruhe et al., "Rolling Diffusion Models," CoRR, Submitted Feb. 12, 2024, arXiv:2402.09470v1, 17 pages.
Saito et al., "Temporal Generative Adversarial Nets with Singular Value Clipping," Paper, Presented at the 2017 IEEE International Conference on Computer Vision (ICCV), Venice, Italy, Oct. 22-29, 2017, pp. 2830-2839 (Author Manuscript).
Seo et al., "HARP: Autoregressive Latent Video Prediction with High-Fidelity Image Generator," CoRR, Submitted on Sep. 15, 2022, arXiv:2209.07143v1, 11 pages.
Singer et al., "Make-A-Video: Text-to-Video Generation without Text-Video Data," Paper, Presented at the Proceedings of the International Conference on Learning Representations, Kigali, Rwanda, May 1-5, 2023, 16 pages.
Sitzmann et al., "Implicit Neural Representations with Periodic Activation Functions," Paper, Presented at the 34th Conference on Neural Information Processing Systems, Virtual Event, Dec. 6-12, 2020; Advances in Neural Information Processing Systems, Dec. 2020, 33, 12 pages.
Skorokhodov et al., "Adversarial Generation of Continuous Images," Paper, Presented at the Proceedings of the IEEE/CVF Conference: Computer Vision and Pattern Recognition, Nashville, Tennessee, Jun. 20-25, 2021, pp. 10753-10764 (Author Manuscript).
Skorokhodov et al., "StyleGAN-V: A Continuous Video Generator with the Price, Image Quality and Perks of StyleGAN2," Paper, Presented at the Proceedings of the IEEE/CVF Conference: Computer Vision and Pattern Recognition, New Orleans, Louisiana, Jun. 18-24, 2022, pp. 3626-3636 (Author Manuscript).
Song et al., "Denoising Diffusion Implicit Models," Paper, Presented at the Proceedings of the International Conference on Learning Representations, Virtual Event, May 3-7, 2021, 20 pages.
Song et al., "Generative Modeling by Estimating Gradients of the Data Distribution," Paper, Presented at the 33rd Conference on Neural Information Processing Systems, Vancouver, Canada, Dec. 8-14, 2019; Advances in Neural Information Processing Systems, Dec. 2019, 32, 13 pages.
Song et al., "Score-Based Generative Modeling through Stochastic Differential Equations," Paper, Presented at the Proceedings of the International Conference on Learning Representations, Virtual Event, May 3-7, 2021, 36 pages.
Soomro et al., "UCF101: A Dataset of 101 Human Actions Classes From Videos in The Wild," CoRR, Submitted Dec. 3, 2012, arXiv:1212.0402v1, 7 pages.
Srivastava et al., "Unsupervised Learning of Video Representations using LSTMs," Paper, Presented at the Proceedings of the International Conference on Machine Learning, Lille, France, Jul. 6-11, 2015; JMLR, Jul. 2015, 37, 10 pages.
Srivastava et al., "VEEGAN: Reducing Mode Collapse in GANs using Implicit Variational Learning," Paper, Presented at the 31st Conference on Neural Information Processing Systems, Long Beach, California, Dec. 4-9, 2017; Advances in Neural Information Processing Systems, Dec. 2017, 30, 11 pages.
Su et al., "Roformer: Enhanced transformer with rotary position embedding," CoRR, Submitted on Nov. 8, 2023, arXiv:2104.09864v5, 14 pages.
Tian et al., "A Good Image Generator is What You Need for High-Resolution Video Synthesis," Paper, Presented at the Proceedings of the International Conference on Learning Representations, Virtual Event, May 3-7, 2021, 23 pages.
Tran et al., "Learning Spatiotemporal Features with 3D Convolutional Networks," Paper, Presented at the 2015 IEEE International Conference on Computer Vision (ICCV), Santiago, Chile, Dec. 7-13, 2015, pp. 4489-4497 (Author Manuscript).
Tulyakov et al., "MoCoGAN: Decomposing Motion and Content for Video Generation," Paper, Presented at the Proceedings of the IEEE/CVF Conference: Computer Vision and Pattern Recognition, Salt Lake City, Utah, Jun. 18-23, 2018, pp. 1526-1535 (Author Manuscript).
Unterthiner et al., "Towards Accurate Generative Models of Video: A New Metric & Challenges," CoRR, Submitted Dec. 3, 2018, arXiv:1812.01717v1, 16 pages.
Van den Oord et al., "Neural Discrete Representation Learning," Paper, Presented at the 31st Conference on Neural Information Processing Systems, Long Beach, California, Dec. 4-9, 2017; Advances in Neural Information Processing Systems, Dec. 2017, 30, 10 pages.
Vaswani et al., "Attention is All You Need," Paper, Presented at the 31st Conference on Neural Information Processing Systems, Long Beach, California, Dec. 4- 9, 2017; Advances in Neural Information Processing Systems, Dec. 2017, 30, 11 pages.
Villegas et al., "High Fidelity Video Prediction with Large Stochastic Recurrent Neural Networks," Paper, Presented at the 33rd Conference on Neural Information Processing Systems, Vancouver, Canada, Dec. 8-14, 2019; Advances in Neural Information Processing Systems, Dec. 2019, 32, 11 pages.
Villegas et al., "Phenaki: Variable Length Video Generation from Open Domain Textual Descriptions," Paper, Presented at the Proceedings of the International Conference on Learning Representations, Kigali, Rwanda, May 1-5, 2023, 14 pages.
Voleti et al., "MCVD: Masked Conditional Video Diffusion for Prediction, Generation, and Interpolation," Paper, Presented at the 36th Conference on Neural Information Processing Systems, New Orleans, Louisiana, Nov. 28-Dec. 9, 2022; Advances in Neural Information Processing Systems, Dec. 2022, 35, 15 pages.
Vondrick et al., "Generating Videos with Scene Dynamics," Paper, Presented at the 30th Conference on Neural Information Processing Systems, Barcelona, Spain, Dec. 5-10, 2016; Advances in Neural Information Processing Systems, Dec. 2016, 29, 9 pages.
Wang et al., "Linformer: Self-Attention with Linear Complexity," CoRR, Submitted Jun. 8, 2020, arXiv:2006.04768v1, 12 pages.
Wang et al., "VideoFactory: Swap Attention in Spatiotemporal Diffusions for Text-to-Video Generation," CoRR, Submitted May 18, 2023, arXiv:2305.10874v1, 13 pages.
Weissenborn et al., "Scaling Autoregressive Video Models," Paper, Presented at the Proceedings of the International Conference on Learning Representations, Virtual Event, Apr. 26-May 1, 2020, 24 pages.
Weng et al., "ART•V: Auto-Regressive Text-to-Video Generation with Diffusion Models," CoRR, Submitted Nov. 30, 2023, arXiv:2311.18834v1, 24 pages.
Wu et al., "Memorizing Transformers," CoRR, Submitted Mar. 16, 2022, arXiv:2203.08913v1, 19 pages.
Yan et al., "Temporally Consistent Transformers for Video Generation," Paper, Presented at the Proceedings of the International Conference on Machine Learning, Honolulu, Hawaii, Jul. 23-29, 2023; PMLR, 2023, 202, 37 pages.
Yan et al., "Temporally Consistent Video Transformer for Long-Term Video Prediction," CoRR, Submitted Oct. 5, 2022, arXiv:2210.02396v1, 31 pages.
Yan et al., "VideoGPT: Video Generation using VQ-VAE and Transformers," CoRR, Submitted Apr. 20, 2021, arXiv:2104.10157v1, 13 pages.
Yang et al., "Diffusion Probabilistic Modeling for Video Generation," CoRR, Submitted Mar. 16, 2022, arXiv:2203.09481v1, 23 pages.
Yang et al., "Graphusion: Latent Diffusion for Graph Generation, " IEEE Transactions on Knowledge and Data Engineering, Nov. 2024, 36(11):6358-6369.
Yin et al., "NUWA-XL: Diffusion over Diffusion for extremely Long Video Generation," CoRR, Submitted Mar. 22, 2023, arXiv:2303.12346v1, 11 pages.
Yin et al., "NUWA-XL: Diffusion over Diffusion for extremely Long Video Generation," Paper, Presented at the Proceedings of the

(56) References Cited

OTHER PUBLICATIONS

61st Annual Meeting of the Association for Computational Linguistics (Long Papers), Toronto, Canada, Jul. 9-14, 2023, 1:1309-1320.
Yoo et al., "Towards End-to-End Generative Modeling of Long Videos with Memory-Efficient Bidirectional Transformers," Paper, Presented at the Proceedings of the IEEE/CVF Conference: Computer Vision and Pattern Recognition, Vancouver, Canada, Jun. 17-24, 2023, pp. 22888-22897 (Author Manuscript).
Yu et al., "Efficient Video Diffusion Models via Content-Frame Motion-Latent Decomposition," Paper, Presented at the Proceedings of the International Conference on Learning Representations, Vienna, Austria, May 7-11, 2024, 29 pages.
Yu et al., "Generating Videos with Dynamics-aware Implicit Generative Adversarial Networks," Paper, Presented at the Proceedings of the International Conference on Learning Representations, Virtual Event, Apr. 25-29, 2022, 25 pages.
Yu et al., "Language Model Beats Diffusion—Tokenizer is Key to Visual Generation," CoRR, Submitted Mar. 13, 2024, arXiv:2310.05737v2, 19 pages.
Yu et al., "Language Model Beats Diffusion-Tokenizer is Key to Visual Generation," Paper, Presented at the Proceedings of the International Conference on Learning Representations, Vienna, Austria, May 7-11, 2024, 19 pages.
Yu et al., "MAGVIT: Masked Generative Video Transformer," Paper, Presented at the Proceedings of the IEEE/CVF Conference: Computer Vision and Pattern Recognition, Vancouver, Canada, Jun. 17-24, 2023, pp. 10459-10469 (Author Manuscript).
Yu et al., "Vector-quantized Image Modeling with Improved VQGAN," Paper, Presented at the Proceedings of the International Conference on Learning Representations, Virtual Event, Apr. 25-29, 2022, 17 pages.
Yu et al., "Video Probabilistic Diffusion Models in Projected Latent Space," Paper, Presented at the Proceedings of the IEEE/CVF Conference: Computer Vision and Pattern Recognition, Vancouver, Canada, Jun. 17-24, 2023, pp. 18456-18466 (Author Manuscript).
Yushchenko et al., "Markov Decision Process for Video Generation," Paper, Presented at the 2019 IEEE/CVF International Conference on Computer Vision Workshop (ICCVW), Seoul, Korea (South), Oct. 27-28, 2019, 10 pages (Author Manuscript).
Zeng et al., "LION: Latent Point Diffusion Models for 3D Shape Generation," Paper, Presented at the 36th Conference on Neural Information Processing Systems, New Orleans, Louisiana, Nov. 28-Dec. 9, 2022; Advances in Neural Information Processing Systems, Dec. 2022, 35, 19 pages.
Zhang et al., "The Unreasonable Effectiveness of Deep Features as a Perceptual Metric," Paper, Presented at the Proceedings of the IEEE/CVF Conference: Computer Vision and Pattern Recognition, Salt Lake City, Utah, Jun. 18-23, 2018, pp. 586-595 (Author Manuscript).
Zheng et al., "Fast Training of Diffusion Models with Masked Transformers," Transactions on Machine Learning Research, Mar. 2024, 22 pages.
Zhou et al., "MagicVideo: Efficient Video Generation With Latent Diffusion Models," CoRR, Submitted Nov. 20, 2022, arXiv:2211.11018v1, 12 pages.
Extended European Search Report in European Appln. No. 25178267.8, mailed on Sep. 30, 2025, 9 pages.

* cited by examiner

| Method | FVD ↓ |
|---|---|
| MoCoGAN [17] | 3679.0 |
| + StyleGAN2 [73] | 2311.3 |
| MoCoGAN-HD [74] | 2606.5 |
| DIGAN [18] | 2293.7 |
| StyleGAN-V [50] | 1773.4 |
| PVDM [44] | 505.0 |
| HVDM [75] | 549.7 |
| **MALT (Ours)** | **220.4** |

650

| Method | FVD ↓ | PSNR ↑ | SSIM ↑ | LPIPS ↓ |
|---|---|---|---|---|
| Perceiver AR [76] | 1022 | 13.4 | 0.310 | 0.404 |
| Latent FDM [20] | 960 | 13.2 | 0.334 | 0.413 |
| TECO [21] | 799 | 13.8 | 0.341 | 0.381 |
| **MALT (Ours)** | **392** | **15.4** | **0.437** | **0.276** |

GENERATING TEMPORAL SEQUENCES USING DIFFUSION TRANSFORMER NEURAL NETWORKS

CROSS-REFERENCE TO RELATED APPLICATION

This application claims priority to U.S. Provisional Application No. 63/650,862, filed on May 22, 2024. The disclosure of the prior application is considered part of and is incorporated by reference in its entirety in the disclosure of this application.

BACKGROUND

This specification relates to processing inputs to generate temporal sequences using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that generates temporal sequences conditioned on an input. A temporal sequence includes a respective data element at each of multiple time points. As an example, a temporal sequence can be a video. Each data element of the video can be a video frame.

Particular embodiments of the subject matter described in this specification can be implemented so as to realize one or more of the following advantages.

The system described in this specification generates long temporal sequences of a variety of data elements, such as videos, audio, or climate data. Generating longer temporal sequences can provide for the coherent presentation of a larger amount of information compared to the generation of shorter temporal sequences. For example, generating a longer temporal sequence can result in a more temporally coherent sequence compared to separately generating multiple shorter temporal sequences and combining them together.

Generating long temporal sequences while maintaining quality, temporal coherence, and alignment with the conditioning input is challenging. For example, some conventional systems for generating videos using diffusion models cannot generate videos longer than the length of videos on which they were trained.

The system described in this specification can generate high-quality temporal sequences of any length. For example, the system can be trained on a training dataset that includes videos that are less than 5 seconds long. The system can generate videos at inference that are longer than 5 seconds, e.g., greater than 120 seconds, at 8 frames per second, without suffering from significant frame quality degradation. The system can generate temporal sequences by generating temporal sequences autoregressively, e.g., by generating segments conditioned on any previously generated segments. As another example, the system can generate videos that are longer than a few seconds, or videos that have a large number of video frames, e.g., greater than 20 video frames, greater than 50 video frames, greater than 100 video frames, etc. For example, the system described in this specification can generate videos with greater than 1024 frames and 8 frames per second.

Generating long temporal sequences of data elements that have a high dimensionality can require a large amount of computing time and computing resources. Some conventional systems generate videos autoregressively conditioned on previous sequences, but with a limited window size of a small number of previous video frames due to computational constraints of processing the high dimensionality of videos. These systems often generate videos without long-term consistency due to conditioning on a small number of previous video frames. These systems also generate videos with a rapid quality drop due to error accumulation as the length of the video increases.

The system described in this specification can generate long videos of high-quality, e.g., with long-term contextual understanding and long-term stability. For example, the system can generate videos using a latent denoising neural network. By using the latent denoising neural network to generate latent representations of segments for a video autoregressively conditioned on a memory vector that represents preceding latent representations for the video, the system generates a video with high-quality and coherence throughout the length of the video. As an example, for each segment other than the first segment, the latent denoising neural network obtains a memory vector that represents one or more hidden states for one or more preceding segments. The latent denoising neural network can generate updated latent representations, i.e., can update latent representations, conditioned on the memory vector. For example, the latent denoising neural network can apply an attention mechanism over the memory vector and a latent representation. The system can condition the latent denoising neural network on long temporal extents while staying within memory limitations and computational constraints. Furthermore, by conditioning on long temporal events, the system can generate long videos without frame quality degradation over time. The system can thus generate videos that are consistent across long timeframes, and with less quality degradation as the length of the video increases.

Furthermore, the system described in this specification can generate long videos of high-quality using fewer computational resources than conventional systems. For example, the latent denoising neural network can include fewer parameters than conventional systems. Each segment is compressed as a lower dimensional latent representation. The latent denoising neural network models the distribution in the latent space of the latent representations, which requires less computing time and memory than modeling the distribution in pixel space. In addition, the system represents preceding segments as a memory vector. By representing preceding segments as a memory vector, the latent denoising neural network can more efficiently, i.e., using less computing time and memory, update a latent representation compared to conditioning directly on one or more preceding latent representations. In addition, the system described in this specification is flexible, as the latent denoising neural network can have any appropriate diffusion Transformer architecture.

The system can perform a variety of video generation tasks, such as unconditional video generation and conditional video generation such as text-to-video generation, or video prediction. For example, the system can obtain an input that includes a conditioning signal that includes an embedding for text, and the output video is described by the text. As another example, the conditioning signal can include embeddings for one or more video frames. The output video includes a coherent continuation of the one or more video frames. The latent denoising neural network can update latent representations conditioned on the conditioning signal, and for each latent representation other than the first latent representation, a memory vector.

The system generates videos that maintain quality for a long horizon without degradation due to error propagation. For example, the system can be trained on a training objective that makes the latent denoising neural network robust to a potentially noisy memory vector at inference. The system can apply noise augmentation to the memory vector during training. For example, the system is trained on memory vectors derived from ground-truth latent representations, with added noise. Thus the system can be trained to reduce the discrepancy between training and inference.

Training can be performed on long videos and is more memory-efficient compared to conventional systems. For example, hardware memory requirements and computation requirements do not increase strictly with video length. In some examples, during training of the latent denoising neural network, the gradients are not backpropagated through all preceding latent representations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
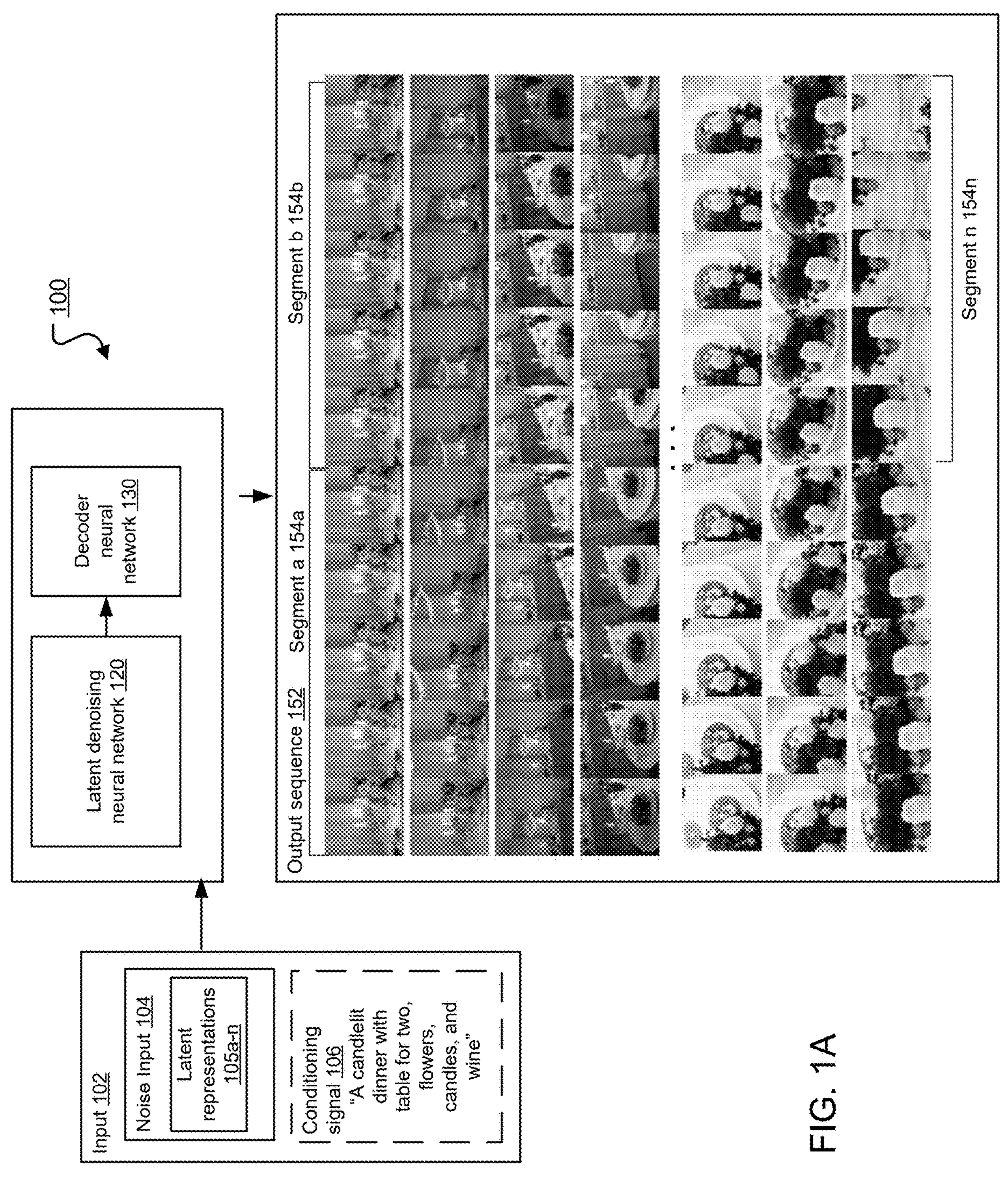
FIG. 1A is a block diagram of an example temporal sequence generation system.

FIG. 1A shows an example temporal sequence generation system 100. The system 100 is an example of a system implemented as computer programs on one or more computers in one or more locations in which the systems, components, and techniques described below are implemented.

The system 100 generates an output temporal sequence 152 conditioned on an input 102.

The output temporal sequence 152 includes a respective data element at each of multiple time points. In the example of FIG. 1A, the output temporal sequence 152 can be a video. Each data element of the video can be a video frame.

A video includes video frames that each include multiple pixels. Each pixel has one or more intensity values. The system can represent a segment of the video that includes one or more video frames as a latent representation.

Although this specification describes generating videos as an example, the system can generate other types of temporal sequences of data elements, such as climate data, audio data, fluid mechanics data, partial differential equation data, etc. The system can be trained to generate a particular type of temporal sequence using appropriate training data.

The output temporal sequence 152 can include multiple segments 154*a-n*. Each segment can include one or more data elements. For example, each segment can include one or more video frames of the output video. In the example of FIG. 1A, each segment includes at least five video frames.

To generate a temporal sequence of data elements, the system obtains the input 102. The input includes a noise input 104 that includes a sequence of one or more latent representations 105*a-n*. The noise input 104 can include a latent representation for each of multiple segments of the temporal sequence. The latent representation for each segment is a representation in latent space for the segment. The latent space can have a lower dimensionality than the data elements. Each latent representation can include one or more latent variables.

In some examples, the system can generate the noise input 104 by sampling the noise input 104 from a noise distribution. For example, the system can initialize the latent representation for each segment by sampling an initial value for each latent variable included in the latent representation from a corresponding noise distribution, e.g., a Gaussian distribution or another predetermined distribution. The latent representation for each segment therefore includes multiple latent variables, with the initial value for each latent variable being sampled from a corresponding noise distribution.

In some examples, the input 102 also includes a conditioning signal 106, also referred to as a conditioning input. For example, the conditioning signal can include an embedding of text that describes what the output video should depict. For example, the text can describe spatial resolution and visual features such as level of detail, subject, background, timing, angle, lighting, contrast, type of shot, etc. In the example of FIG. 1A, the conditioning signal 106 includes an embedding of the text "A candlelit dinner with table for two, flowers, candles, and wine."

In some examples, the system can generate the embedding of the text from a natural language sequence of text, e.g., using a text encoder neural network. The text encoder neural network can have any appropriate neural network architecture, e.g., a feedforward architecture, e.g., an encoder-only Transformer neural network, or a recurrent architecture, that allows the neural network to map the natural language sequence of text to the embedding of the text. An embedding refers to an ordered collection of numerical values, e.g., a vector, matrix, or other tensor of numerical values.

For example, the system can receive the text from a user. As a particular example, the text encoder neural network can include a T5 text encoder, described in further detail in Raffel et al., Exploring the Limits of Transfer Learning with a Unified Text-to-Text Transformer, arXiv preprint arXiv: 1910.10683 (2019). As another example, the text encoder neural network can include a BERT encoder, described in further detail in Devlin et al., BERT: Pre-training of Deep Bidirectional Transformers for Language Understanding, arXiv preprint arXiv:1810.04805 (2018).

While the specification describes the conditioning signal in the form of text (or an embedding of text), in other implementations, the conditioning signal can be a different type of data, e.g., a pre-existing temporal sequence of data elements, an embedding of a pre-existing temporal sequence of data elements, a pre-existing video, an embedding of a pre-existing video, an image, an embedding of an image, a numeric representation of a desired object category for the video, an audio signal characterizing a scene that the video should depict, an audio signal that includes speech that describes the video, an embedding of an audio signal, combinations thereof, and so on. The methods and systems disclosed herein can be applied to any conditioned temporal sequence generation.

The system updates the latent representations 105*a-n* using a latent denoising neural network 120. The latent denoising neural network 120 is described in further detail below with reference to FIGS. 1B-2B.

The system processes the latent representations 105*a-n* using a decoder neural network 130 to generate the output sequence 152. The decoder neural network 130 is described in further detail below with reference to FIG. 1B.

In the example of FIG. 1A, the output sequence 152 for the input 102 includes a video that depicts the text of the conditioning signal 106. For example, FIG. 1A shows example frames of the video that depict "a candlelit dinner with table for two, flowers, candles, and wine."

In some examples, the system 100 can provide the output sequence 152 for presentation. The system can provide the output video for display, for example, to a user. Users can interact with the system, e.g., by providing inputs to the system by way of an interface, e.g., a graphical user interface, or an application programming interface (API). In particular, a user can provide an input that includes a conditioning signal. The system can provide the output video to the user, e.g., for display on a user device of the user, or for storage in a data storage device. In some cases, the system can transmit a generated video to a user device of the user, e.g., by way of a data communication network (e.g., the internet).

Figure 1B:
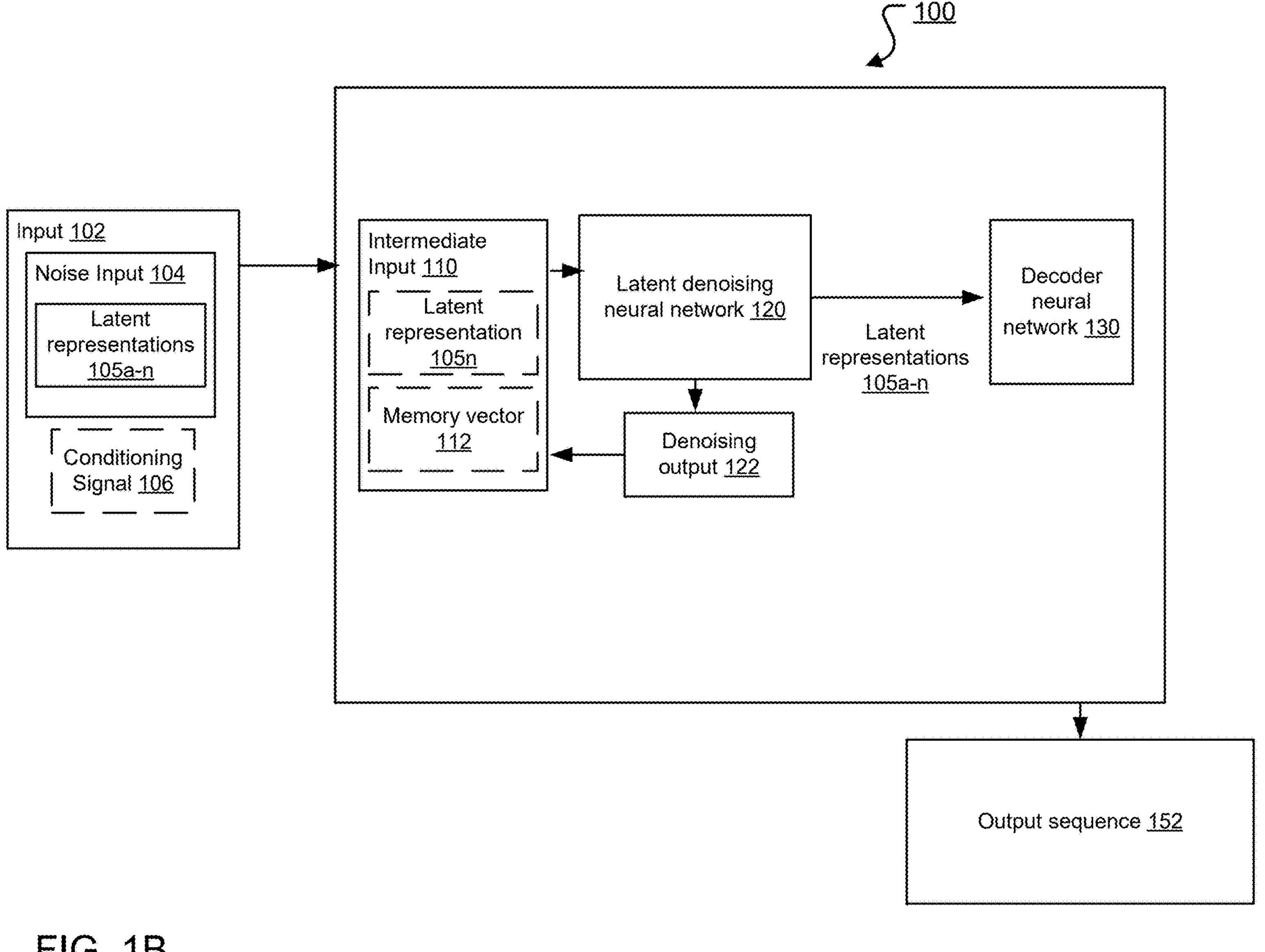
FIG. 1B is a block diagram of another example temporal sequence generation system.

FIG. 1B shows the example temporal sequence generation system 100 described above with reference to FIG. 1A.

The system processes the input 102 using the latent denoising neural network 120 to generate, for each segment, an updated latent representation 105*a-n*. The latent denoising neural network is configured to autoregressively update, e.g., de-noise, each latent representation. For example, the latent denoising neural network updates each latent representation conditioned on any preceding updated latent representations, i.e., conditioned on a memory vector that represents any preceding updated latent representations. For any given latent representation, the system performs a reverse diffusion process to update the latent representation.

For example, the latent denoising neural network 120 can update the latent representation 105*a* for the first segment a by performing a reverse diffusion process. The latent denoising neural network 120 can update the latent representation 105*b-n* for each segment other than the first segment by performing a reverse diffusion process conditioned on at least the latent representation for one or more preceding segments. For example, the system can represent the one or more preceding segments using a memory vector. In some examples, the latent denoising neural network 120 can update the latent representation for each segment conditioned on the conditioning signal.

In particular, for each segment of the segments 154*a-n*, the latent denoising neural network 120 performs a reverse diffusion process to update the latent representation of the latent representations 105*a-n* at each of multiple iterations.

At each iteration, the system processes an intermediate input 110 for the iteration that includes at least the latent representation to generate a denoising output 122. In some examples, e.g., for segments other than the first segment, the intermediate input 110 can include a memory vector 112. The latent denoising neural network 120 updates the latent representation at each iteration conditioned on at least the memory vector 112.

In examples where the input 102 includes a conditioning signal 106, the intermediate input 110 at each iteration also includes the conditioning signal 106. The latent denoising neural network 120 updates the latent representation at each iteration conditioned on at least the conditioning signal 106.

The denoising output 122 includes a noise estimate for the latent representation. For example, the noise estimate defines how the actual latent representation for the segment, if known, would need to be modified to generate the latent representation given a noise level corresponding to the current iteration.

At each iteration, the system updates the latent representation using the denoising output 122 for the iteration. For example, the system modifies the latent representation using the denoising output 122.

In particular, for the first segment 154*a* of the segments 154*a-n*, the system updates the latent representation 105*a* by updating the latent representation 105*a* at each of multiple iterations. For example, as described above, at each iteration, the latent denoising neural network 120 processes an intermediate input 110 for the iteration to generate a denoising output 122, and updates the latent representation 105*a* using the denoising output 122 for the iteration. The intermediate input 110 at each iteration includes the latent representation 105*a*.

For each segment other than the first segment of the segments 154*a-n*, the system also obtains a memory vector 112 representing one or more hidden states. The system includes the memory vector 112 in the intermediate input 110 for the iteration.

In some examples, the memory vector can represent different numbers of hidden states for preceding latent representations. In some examples, the memory vector includes an encoding for each hidden state. The latent denoising neural network can generate encodings for each hidden state to obtain the memory vector. For example, the latent denoising neural network can encode a hidden state by updating the memory vector based on the hidden state and the existing memory vector. Obtaining the memory vector is described in further detail below with reference to FIG. 3.

Each hidden state is derived from one or more outputs of one or more layers of the latent denoising neural network generated when updating the latent representations for one or more preceding segments using the latent denoising neural network. In some examples, each hidden state can be derived from the one or more outputs of a respective corresponding layer, e.g., neural network layer, of the latent denoising neural network. In some examples, each hidden state can include the outputs of one or more layers of the latent denoising neural network generated when updating the latent representations for one or more preceding segments at the last denoising iteration.

For example, each hidden state can include the outputs of one neural network layer of the latent denoising neural network when updating the latent representations for the preceding segment. As a particular example, for each neural network layer, the hidden state for the neural network layer can include the outputs of the neural network layer after updating the latent representation for the preceding segment at the last denoising iteration, resulting in the clean latent representation for the preceding segment.

In some examples, each output of the neural network layer can correspond to a patch of the latent representation.

In some examples, the memory vector can represent the outputs of all of the neural network layers, e.g., can represent hidden states derived from outputs of all of the neural network layers. In some examples, the memory vector can represent the outputs of a subset of the neural network layers, e.g., can represent hidden states derived from the outputs of some but not all of the neural network layers.

For example, the latent denoising neural network can maintain the hidden states when updating the first latent representation. When updating the second latent representation, the latent denoising neural network can obtain the hidden states for the first latent representation represented as the memory vector.

For example, FIG. 1B shows the intermediate input 110 for the last segment 154*n*. The intermediate input 110 includes the latent representation 105*n*. The memory vector 112 represents the hidden states for the latent representations 105*m*.

The latent denoising neural network can have any appropriate architecture for autoregressively updating each latent representation. As an example, the latent denoising neural network can include a diffusion Transformer model. An example suitable diffusion Transformer model is described in Gupta et al., "Photorealistic Video Generation with Diffusion Models," arXiv preprint arXiv:2312.06662 (2023), which is hereby incorporated by reference in its entirety. Other example diffusion Transformer models are described in Ma et al., VDT: General-Purpose Video Diffusion Transformers via Mask Modeling, arXiv preprint arXiv: 2305.13311 (2023), and Ma et al., Latte: Latent Diffusion Transformer for Video Generation, arXiv preprint arXiv: 2401.0304 (2024).

The latent denoising neural network can include multiple types of layers, including layers for performing attention, such as layer normalization layers, cross attention layers, feedforward layers, multi-head attention layers, MLP layers, etc. An example latent denoising neural network 120 is described in further detail below with reference to FIGS. 2A-2B.

The system generates the output temporal sequence of data elements by processing the latent representations 105*a-n* that have been updated by the latent denoising neural network 120 for the segments using the decoder neural network 130. For example, the decoder neural network 130 can be configured to decode a latent representation to one or more video frames.

For example, the system can generate the output temporal sequence of data elements by processing each latent representation 105*a-n* using the decoder neural network 130 to generate one or more respective video frames for the latent representation. The system can combine the respective video frames for each latent representation to generate the output temporal sequence of data elements. The system can thus process multiple latent representations 105*a-n* in parallel, reducing the computing time required to decode the latent representations 105*a-n* compared to processing multiple latent representations at once, or processing latent representations serially.

In some examples, the decoder neural network 130 can be the decoder neural network of an autoencoder for which the encoder neural network is configured to generate a latent representation for a given segment of a temporal sequence of data elements. For example, the decoder neural network 130 can be the decoder of a video autoencoder. In some examples, the autoencoder can have a causal 3D CNN encoder-decoder architecture. An example autoencoder is the MAGVIT-v2 tokenizer without quantization, described in Yu et al., "Language Model Beats Diffusion—Tokenizer is Key to Visual Generation," arXiv preprint arXiv: 2310.05737 (2024), and Gupta et al., "Photorealistic Video Generation with Diffusion Models," arXiv preprint arXiv: 2312.06662 (2023).

Figure 2A:
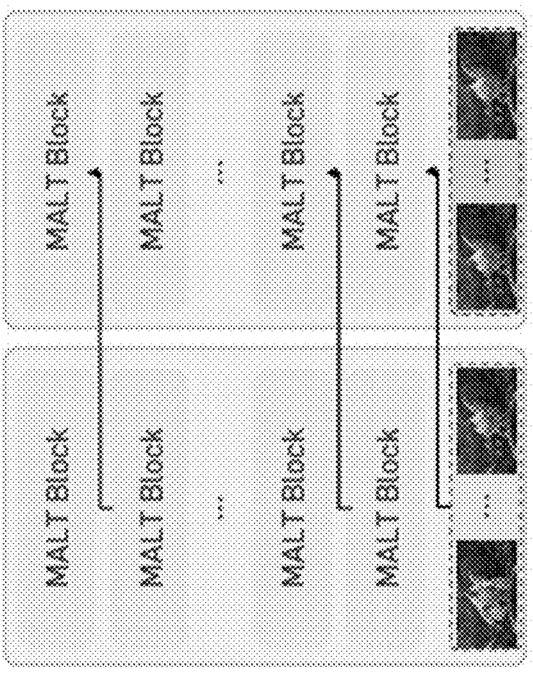
FIG. 2A shows an example latent denoising neural network.
Figure 2A:
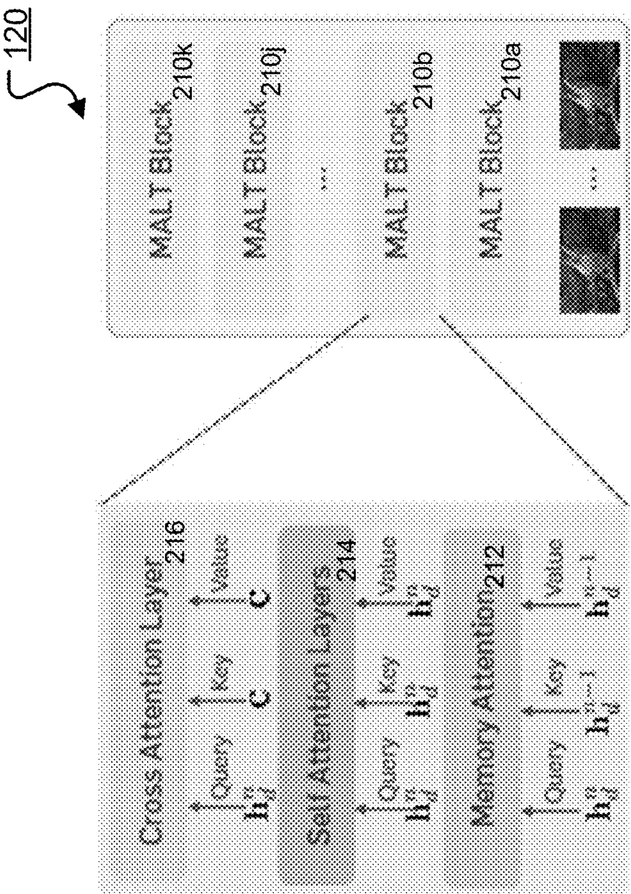

FIG. 2A shows an example latent denoising neural network 120 described above with reference to FIGS. 1A-1B. For example, the latent denoising neural network 120 has a diffusion Transformer (DiT) architecture.

FIG. 2A shows the latent denoising neural network 120 updating multiple latent representations using a sequence of neural network layers 210*a-k*, each labeled as "MALT Block." Each neural network layer can be a Transformer layer that includes one or more layers for performing attention.

For example, FIG. 2A shows that a neural network layer 210*b* includes a memory attention layer 212, one or more self-attention layers 214, and a cross attention layer 216.

The latent denoising neural network 120 updates a particular latent representation conditioned on at least one or more preceding latent representations by applying attention between the particular latent representation and the memory vector representing the one or more preceding latent representations. For example, the latent denoising neural network is configured to apply attention over the memory vector and the latent representation with keys and values derived from the memory vector and queries derived from the latent representation. For example, the memory attention layer 212 for a neural network layer d can be a cross-attention layer between the memory vector $h^{n-1}$ and one or more current hidden states for the latent representation. Thus, the query, key, and value for a d-th layer with the segment $z^n$ can be derived as query $$:= h_d^n,\ \text{key} := [h_d^{n-1}, h_d^n],\ \text{value} := [h_d^{n-1}, h_d^n],$$
$$\text{where } h_d^{n-1}, h_d^n \in \mathbb{R}^{(hw/p_s^2)\times(l/p_l\times c')}.$$

c' denotes the hidden dimension of the latent denoising neural network, and $$h_d^{n-1}, h_d^n$$

are reshaped as a sequence length of $l/p_l$ and a batch dimension size $$hw/p_s^2.$$

In some examples, the latent denoising neural network is configured to apply attention using relative positional encoding between the keys and queries. In some examples, the system can add relative position embeddings to the key embeddings. In some examples, the system can incorporate relative position information into the attention score. The system can thus generalize better at inference to different context lengths not seen during training, allowing for the handling of longer context lengths.

In some examples, the latent denoising neural network applies attention over the memory vector and the latent representation, e.g., by applying attention over the memory vector and the one or more current hidden states for the latent representation, for patches that have the same spatial location within data elements. For example, the memory attention layer 212 can compute cross-attention over the memory vector and the hidden states for tokens representing each of $l/p_t$ patches that have the same spatial location in two or more data elements of the latent representation. By limiting the computation of attention to the spatial locations, the system minimizes the increased computation from the memory attention layer, compared to performing full attention between large numbers of video patches.

In examples where the input includes a conditioning signal c, the latent denoising neural network is configured to apply attention over the conditioning signal and the latent representation. For example, the latent denoising neural network can include multiple layers that are each configured to apply attention with keys and values derived from the conditioning signal and queries derived from the latent representation. For example, the cross attention layer 216 can perform cross-attention over the conditioning signal and the latent representation with keys and values derived from the conditioning signal and queries derived from the latent representation. For example, the query can be derived from one or more current hidden states for the latent representation $$h_d^n,$$

and the key and value can be derived from the conditioning signal c.

The latent denoising neural network can be configured to apply self-attention for the particular latent representation, e.g., with queries, keys, and values derived from a set of current hidden states for the particular latent representation. For example, the one or more self attention layers 214 can perform self-attention for the particular latent representation. As described with reference to FIG. 2B, the self-attention can be spatial self-attention, spatiotemporal self-attention, or both. In particular, the latent denoising neural network 120 employs windowed attention, as described with reference to FIG. 2B and in Gupta et al., "Photorealistic Video Generation with Diffusion Models," arXiv preprint arXiv:2312.06662 (2023).

Figure 2B:
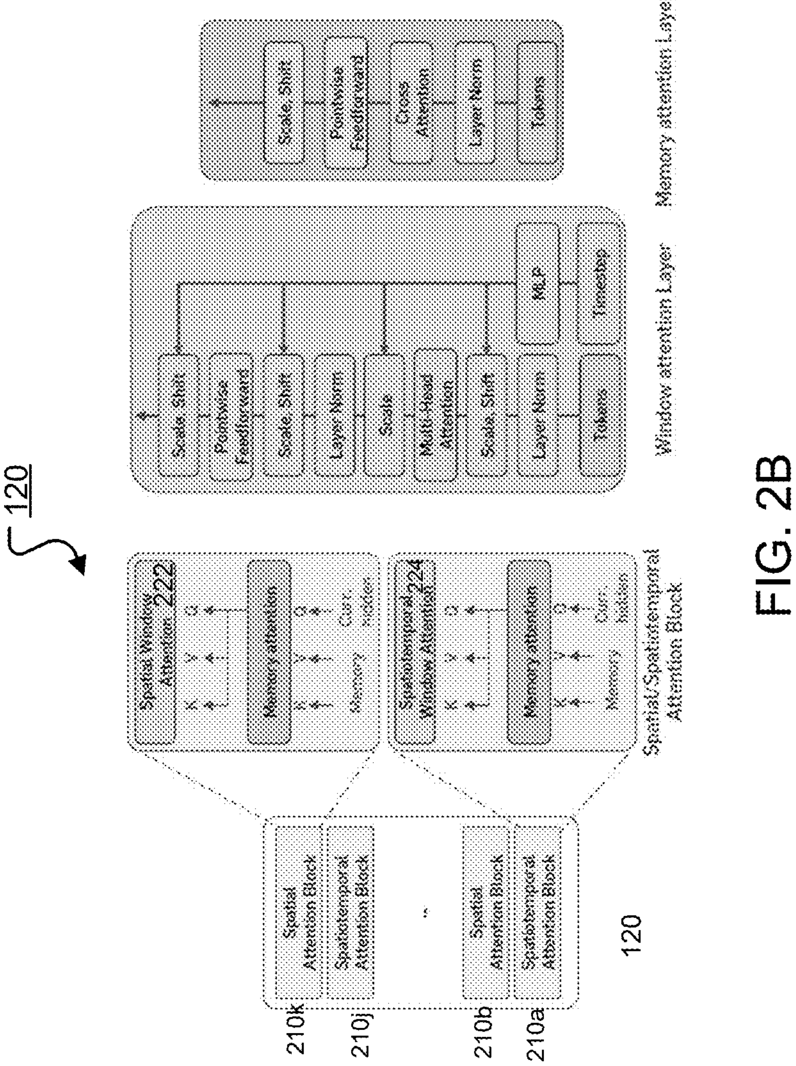
FIG. 2B shows example neural network layers of a latent denoising neural network.

FIG. 2B shows example neural network layers 210*a-k* of the latent denoising neural network 120. As described above with reference to FIG. 2A, each neural network layer includes a memory layer. FIG. 2B shows that the neural network layers can alternate between performing spatiotemporal attention and spatial attention, rather than each layer performing full attention.

In some examples, the latent denoising neural network is configured to apply spatial self-attention for the particular latent representation. For example, the latent denoising neural network can be configured to apply self-attention with keys, values, and queries derived from tokens representing a same data element, e.g., video frame, of the segment represented by the particular latent representation.

In the example of FIG. 2B, the neural network layer 210*b* and the neural network layer 210*k* are referred to as spatial attention blocks. Each spatial attention block can include a spatial window attention layer 222. The spatial window attention layer 222 can perform self-attention over keys, values, and queries derived from a set of current hidden states for the particular latent representation, e.g., the hidden states corresponding to the tokens representing the same data element.

In some examples, the latent denoising neural network is configured to apply spatiotemporal self-attention for the particular latent representation. For example, the latent denoising neural network can be configured to apply self-attention with keys, values, and queries derived from tokens representing two or more data elements of the segment represented by the particular latent representation. In some examples, the tokens can represent the same spatial region of the two or more data elements, e.g., video frames.

In the example of FIG. 2B, the neural network layer 210*a* and the neural network layer 210*j* are referred to as spatiotemporal attention blocks. For example, each spatiotemporal attention block can include a spatiotemporal window attention layer 224. The spatiotemporal window attention layer 224 can perform self-attention over keys, values, and queries derived from a set of current hidden states for two or more data elements of the segment, e.g., the hidden states corresponding to the tokens representing the same spatial region of the two or more data elements.

In these examples, the latent denoising neural network can apply a windowed attention mechanism for computational efficiency. For example, the system can use windowed attention layers to avoid full attention layers between a large number of patches. In some examples, the spatial attention blocks, the spatiotemporal attention blocks, or both, can use Low-Rank Adaptation (LoRA) for parametrization of multilayer perceptrons (MLPs). For example, the spatial attention blocks, spatiotemporal attention blocks, or both, can include one or more MLPs. During training, the system can freeze the weight matrix for the MLPs, and add one or more smaller matrices that are low-rank. The system can represent any changes or updates to the weight matrix using the smaller matrices. At inference, the system can use an updated weight matrix that is derived from the frozen weight matrix and the smaller matrices. The system can thus reduce the number of parameters that would otherwise be required, without performance degradation.

In some examples, the system can use adaptive instance normalization (AdaIN). For example, adaptive instance normalization can be incorporated by including, for each window attention layer i, a multilayer perceptron (MLP) layer to regress a vector of conditioning parameters that are based at least on embeddings for the conditioning signal and the diffusion timestep, and scale and shift parameters that scale and shift the inputs of the multi-head attention and MLP layers, and the output of the multi-head attention and MLP layers.

In some implementations adaptive layer normalization can be incorporated by including, for each layer i, a multilayer perceptron (MLP) layer to regress a vector of conditioning parameters $A^i=MLP(c+t)$, where $A^i=concat(\gamma_1, \gamma_2, \beta_1, \beta_2, \alpha_1, \alpha_2)$, $A^i \in \mathbb{R}^{6 \times d_{model}}$, and $c \in \mathbb{R}^{d_{model}}$, $t \in \mathbb{R}^{d_{model}}$ are the condition and timestep embeddings and $d_{model}$ is the dimensionality of the latent representations. In the transformer block, $\gamma$ and $\beta$ scale and shift the inputs of the multi-head attention and MLP layers, respectively, while $\alpha$ scales the output of both the multi-head attention and MLP layers. AdaIN is described in further detail with reference to Gupta et al., "Photorealistic Video Generation with Diffusion Models," arXiv preprint arXiv:2312.06662 (2023). The system can thus reduce the number of parameters that would otherwise be required, without performance degradation.

Figure 3:
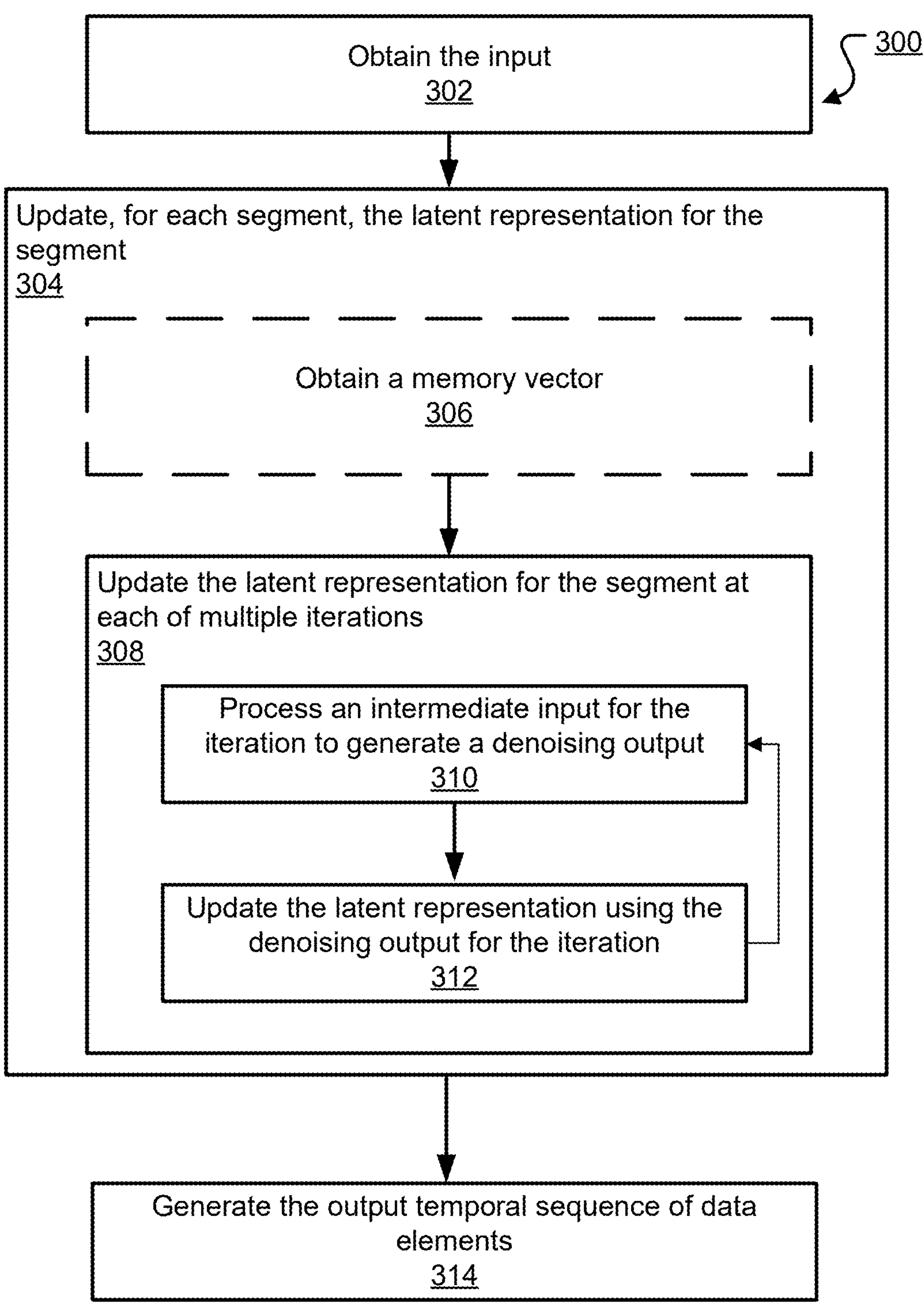
FIG. 3 is a flow diagram of an example process for generating a temporal sequence of data elements.

FIG. 3 is a flow diagram of an example process 300 for generating an output temporal sequence of data elements conditioned on an input. For convenience, the process 300 will be described as being performed by a system of one or more computers located in one or more locations. For example, a temporal sequence generation system, e.g., the system 100 depicted in FIGS. 1A-1B, appropriately programmed in accordance with this specification, can perform the process 300.

The system obtains the input (step 302). The input includes a noise input that includes a respective latent representation for each of multiple segments of the temporal sequence. Each segment includes one or more data elements of the output temporal sequence of data elements.

In some implementations, the system can sample the noise input from a noise distribution. For example, for each latent representation $z^n$, the system can sample random noise from a noise distribution as $$z_T^n \sim p(z_T).$$

In some examples, the noise distribution can be a Gaussian distribution.

In some implementations, the system can represent each of the latent representations as a respective sequence of embeddings, each representing a respective patch of the latent representation. For example, for a latent representation $z^n \in \mathbb{R}^{l \times h \times w \times c}$, where l is length, h is height, w is width, and c is the number of channels, each patch can have a patch size of $p_l \times p_s \times p_s$, where $p_l$ is the temporal patch size and $p_s$ is the spatial patch size.

For example, for each latent representation, the system can generate a respective patch embedding for each respective patch of the latent representation. For example, the system can divide the latent representation into a sequence of patches. The system can process each patch using one or more embedding layers to generate the respective patch embedding.

The system can generate one or more corresponding positional embeddings for each of the respective patch embeddings. In some examples, the corresponding positional embeddings can be learnable or fixed. In some examples, the one or more positional embeddings are derived from spatial positional embeddings and temporal positional embeddings. For example, the one or more positional embeddings can include a positional embedding that is the sum of a spatial positional embedding and a temporal positional embedding.

The system can generate the respective sequence of embeddings by combining, for each respective patch embedding, the respective patch embedding and the one or more corresponding positional embeddings. For example, the system can add the respective patch embedding and the one or more corresponding positional embeddings. The respective sequence of embeddings thus forms a flattened latent vector of $$\mathbb{R}^{(lwh/p_l p_s^2 \times c)}$$

with a sequence length $$lwh/p_l p_s^2.$$

Representing a latent representation as a respective sequence of embeddings that each represents a respective patch of the latent representation is described in further detail in Dosovitskiy et al., An Image is Worth 16×16 Words: Transformers for Image Recognition at Scale, arXiv preprint arXiv: 2010.11929 (2020).

In some examples, the input can further include a conditioning signal c. The conditioning signal can include further information for guiding the generation of the output temporal sequence of data elements. For example, the conditioning signal can include data representing text describing the output temporal sequence of data elements, data representing one or more data elements, etc.

In some examples, the data representing one or more data elements can include the one or more data elements, or embeddings representing the one or more data elements. In some examples, the system can generate embeddings representing the one or more data elements from the one or more data elements. For example, the system can process the one or more data elements using an encoder. As an example, for one or more video frames, the system can process the one or more video frames using a video encoder, e.g., of an autoencoder.

The system updates, for each segment, the latent representation for the segment (step 304). For example, the system can update the latent representation for the segment using a latent denoising neural network. The latent denoising neural network can be configured to autoregressively update the latent representations for each segment. That is, the latent denoising neural network can update the particular latent representation for each segment for the temporal sequence conditioned on the latent representations for any preceding segments for the temporal sequence, e.g., latent representations that have already been updated for any previous positions of segments for the temporal sequence that preceded the particular position of the segment for the particular latent representation.

The system performs steps 306-308 for each segment other than the first segment. For the first segment, the system performs steps 308.

For each segment other than the first segment, the system obtains a memory vector (step 306). The memory vector $h^{n-1}$ represents one or more hidden states generated by the latent denoising neural network when updating the latent representations for one or more preceding segments.

In some examples, the system maintains a memory vector that is updated by the latent denoising neural network when updating the latent representations for one or more preceding segments.

Each hidden state can be derived from one or more outputs of one or more layers of the latent denoising neural network generated when updating a preceding latent representation. For example, the hidden state for each neural network layer can include the outputs of the neural network layer after updating the preceding latent representation at the last denoising iteration. In some examples, each output can correspond to a respective patch of a latent representation. In some examples, each hidden state can include the outputs of a neural network layer that includes multiple attention layers, e.g., the layers 210*a*-*k* of FIG. 2A.

For each segment, the system updates the latent representation for the segment at each of multiple iterations (step 308). The system performs the steps 310-312 at each iteration i of M iterations.

The system processes an intermediate input for the iteration to generate a denoising output (step 310).

For the first segment, the intermediate input for the iteration includes at least the latent representation.

For each segment other than the first segment, the intermediate input for the iteration includes at least the latent representation and the memory vector obtained in step 306.

In examples where the input includes a conditioning signal c, the intermediate input for the iteration includes the conditioning signal c.

The system generates the denoising output $$\epsilon_i \leftarrow D_\theta(z_i^n, t; h^{n-1}, c)$$

by processing the intermediate input for the iteration i using the latent denoising neural network $D_\Theta$. The denoising output $\epsilon_i$ is a score that estimates the noise component of the latent representation at the iteration $$z_i^n.$$

t represents the diffusion timestep or noise level.

The system updates the latent representation using the denoising output for the iteration (step 312). For example, the system can update the latent representation, e.g., using any appropriate diffusion model state transition rule, e.g., DDIM (further details of which can be found in J. Song et al., Denoising Diffusion Implicit Models, ICLR 2021, which is hereby incorporated by reference in its entirety), DDPM (further details of which can be found in J. Ho et al., Denoising Diffusion Probabilistic Models, NeurIPS, 2020, which is hereby incorporated by reference in its entirety), or another appropriate state transition rule. As an example, the system can update the latent representation $$z_{i+1}^n$$

by taking a Euler step according to $$z_{i+1}^n \leftarrow z_i^n + (t_{i+1} - t_i)\epsilon_i,$$

where $t_i$ is the diffusion timestep associated with the beginning of the iteration, and $t_{i+1}$ is the diffusion timestep at the end of the iteration.

In some implementations, the system can use guidance when performing the reverse diffusion process. That is, the reverse diffusion process is sometimes a guided reverse diffusion process. In some examples, the guidance can be a classifier-free guidance.

Using classifier-free guidance can involve generating, by the latent denoising neural network, at any given iteration, multiple denoising outputs. In examples where the input includes the conditioning signal c, the system can generate a first denoising output for the iteration by processing an intermediate input that includes the conditioning signal c.

The system can generate a second denoising output for the iteration by processing an intermediate input that does not include the conditioning signal c, e.g., includes a null value. The system can combine the first and second denoising outputs, e.g., according to a weighted sum, to generate a combined denoising output. The system can use the combined denoising output to update the latent representation.

The system computes the memory vector $h^n$ for the latent representation based on the memory vector $h^{n-1}$ obtained in step 306 and the updated latent representation for the segment $$z_M^n.$$

For example, the system can compute the updated memory vector by processing the updated latent representation for the segment $$z_M^n,$$

the previous memory vector $h^{n-1}$, and in some examples, the conditioning signal c, using the latent denoising neural network to compute the memory vector $h^n$. The memory vector $h^n$ can represent one or more hidden states generated by the latent denoising neural network when processing the updated latent representation for the segment $$z_M^n.$$

For example, the system can compute $h^n$ according to $$h^n = HiddenState(D_\theta(z_M^n, 0; h^{n-1}, c)).$$

The system generates the output temporal sequence of data elements (step 314). For example, the system can process the latent representations for the multiple segments $[z^1, \ldots, z^N]$ using a decoder neural network to generate the output temporal sequence $[x^1, \ldots, x^N]$, where the output temporal sequence includes N segments.

In some examples, the output temporal sequence of data elements is a video x. Each data element is a video frame. In these examples, the decoder neural network can be configured to generate one or more video frames given a latent representation for the one or more video frames.

In some of these examples, the input can include a conditioning signal that represents text describing the output video. For example, the conditioning signal can include text describing the output video, or an embedding of text describing the output video.

In some examples, the system can generate the embedding of text describing the output video given the text describing the output video. For example, the system can process the text describing the output video using a text encoder such as a text encoder neural network. The text encoder neural network can have any appropriate neural network architecture, e.g., a feedforward architecture, e.g., an encoder-only Transformer neural network, or a recurrent architecture, that allows the neural network to map the natural language sequence of text to the embedding of the text. As an example, the text encoder can include a T5 text encoder.

Figure 4:
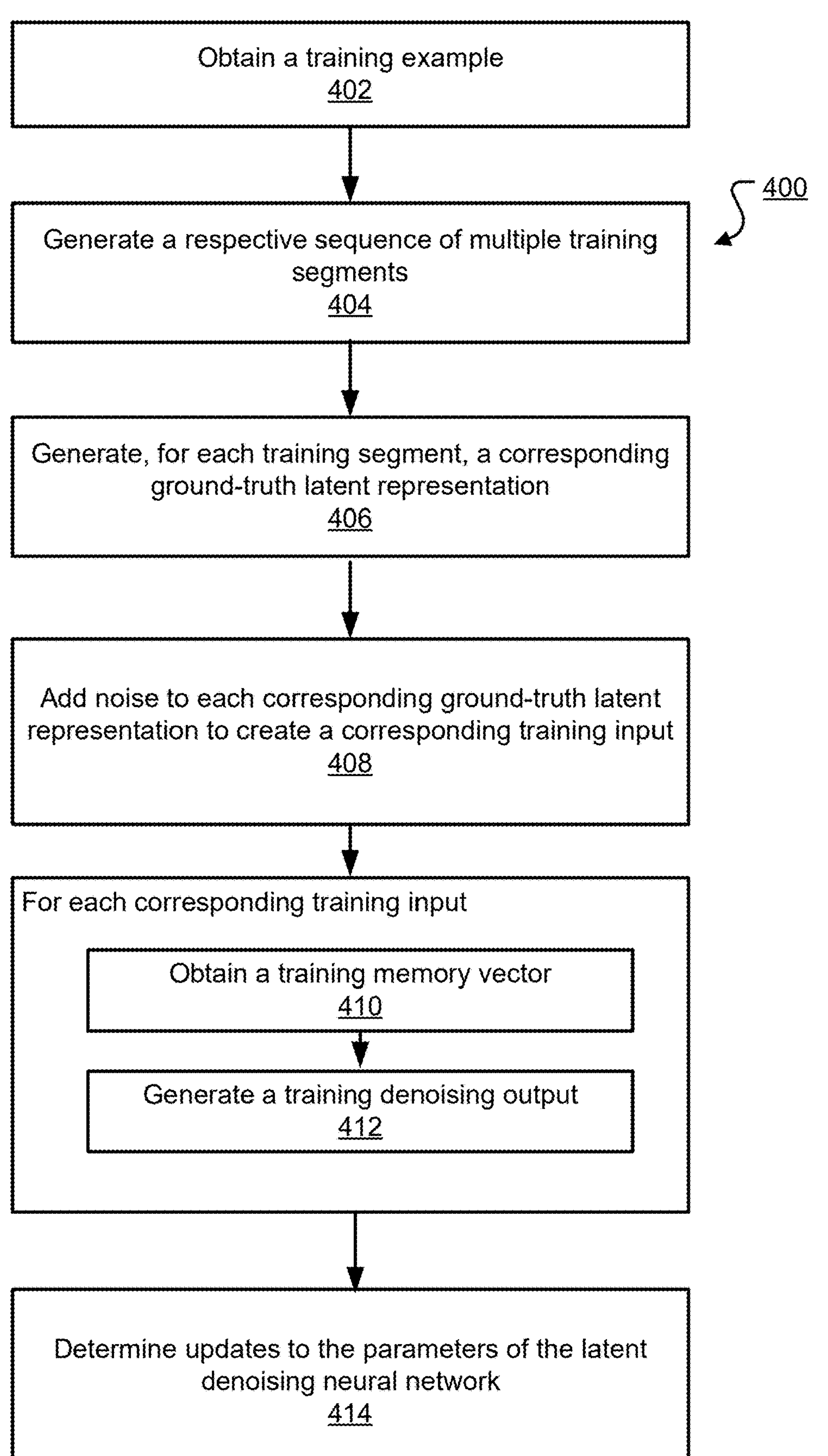
FIG. 4 is a flow diagram of an example process for training an example latent denoising neural network.

FIG. 4 is a flow diagram of an example process 400 for training an example latent denoising neural network. For convenience, the process 400 will be described as being performed by a system of one or more computers located in one or more locations. For example, a temporal sequence generation system, e.g., the system 100 depicted in FIGS. 1A-1B, or a separate training system, appropriately programmed in accordance with this specification, can perform the process 400.

The system can perform the process 400 repeatedly to train the latent denoising neural network. For example, the system can perform the process 400 for multiple training examples.

The system obtains a training example (step 402). The training example includes (i) a respective training temporal sequence of data elements that includes multiple training data elements and (ii) a training conditioning signal. In some examples, the training conditioning signal can include text, an embedding of text, one or more data elements, embeddings for one or more data elements, or a null value.

The system generates a respective sequence of multiple training segments from the training temporal sequence of data elements (step 404). Each training segment can include a consecutive subset of one or more training data elements.

The system generates, for each training segment, a corresponding ground-truth latent representation (step 406). For example, the system can process each training segment using an encoder neural network to generate the corresponding ground-truth latent representation. As an example, the encoder neural network can be the encoder neural network of an autoencoder, for which the decoder neural network is configured to reconstruct the training segment. For example, the encoder neural network can be denoted as F(x) and can be configured to generate a latent representation z given temporal sequence x. For example, the system can generate, for each training segment $x_0$, a corresponding ground-truth latent representation $z_0=F(x_0)$, also referred to as a clean latent representation.

In some examples, the system can perform the process 400 after training the encoder neural network, the decoder neural network, or both. Training the encoder neural network and the decoder neural network is described in further detail below.

The system adds noise to each corresponding ground-truth latent representation to create a corresponding training input (step 408). For example, the system can sample a diffusion timestep $t\in[0, T]$ that corresponds with a noise level. The system can sample noise $\epsilon\sim\mathcal{N}(0, \sigma^2 I)$ with a standard deviation $\sigma>0$ from a noise distribution, e.g., from a Gaussian distribution. The system can add the noise to the ground-truth latent representation in accordance with the diffusion timestep to create the corresponding training input. For example, the corresponding training input for a training segment i can be computed as $z_0+\epsilon$. In some examples, the system can scale the noise based on the noise schedule for the sampled diffusion timestep t.

The system can perform the step 412 for each corresponding training input. For each corresponding training input other than a first corresponding training input, the system can perform the steps 410-412.

For each corresponding training input other than a first corresponding training input, the system can obtain a training memory vector (step 410). The training memory vector represents one or more hidden states for preceding corresponding training inputs. For example, the training memory vector can represent one or more hidden states generated by the latent denoising neural network when updating the one or more preceding corresponding training inputs. For example, each hidden state can be derived from one or more outputs of one or more layers of the latent denoising neural network generated when updating a preceding training input. As an example, each hidden state can include the outputs of d neural network layers of the latent denoising neural network generated after updating the preceding training input at the last denoising iteration.

The training memory vector $h^n$ can be a fixed-size memory vector that is computed from $h^i$ for $1\leq i\leq n$, and encodes the previous sequence of segments $z^{1:n}$. Each $h^i$ can include $$h^i := [h_1^i, \ldots, h_d^i]$$

where d>0 is a number of hidden states that are used to generate the memory vector (i.e., i is a segment index and d refers to the number of neural network layers of the latent denoising neural network from which hidden states are derived from the outputs of the neural network layers).

In some examples, the system can compute $h^i$ for $1\leq i\leq n$ based on at least the corresponding ground-truth latent representation $$z_0^i$$

for the i-th segment. For example, $h^i$ can be derived from one or more outputs of one or more layers of the latent denoising neural network generated when processing the corresponding ground-truth latent representation $$z_0^i$$

conditioned on the memory vector $h^{i-1}$. For example, the system can compute $h^i$ according to the recurrent mechanism $$h^i = HiddenState(D_\theta(z_0^i, 0; sg(h^{i-1}, c))), \; h^0 = [0, \ldots, 0],$$

where $$z_0^i$$

is the corresponding ground-truth latent representation for the i-th segment.

In some examples, each hidden state is derived from one or more outputs of one or more layers of the latent denoising neural network generated when processing the corresponding ground-truth latent representation for a preceding training segment conditioned on frozen memory vectors for any preceding training segments for the preceding training segment. For example, in the equation above, sg denotes a stop-grad operation. When calculating the gradients for updating the parameters of the latent denoising neural network, the gradients will not flow back into the computation of the previous memory vector $h^{i-1}$. That is, the stop-grad operation is applied to the $h^i$ for i<n, which are used to compute $h^n$, which allows for reduced memory requirements during training.

In some implementations, the system can add noise to the training memory vector $h^n$. In some examples, the noise can be sampled from a pre-defined prior distribution, e.g., a Gaussian distribution. For example, the system can add noise to the memory vector according to $\tilde{h}^n$=HiddenState $(D_\theta(z^n+\xi, 0; sg(h^{n-1}, c))$, $h^0=[0, \ldots, 0]$, where the noise is sampled from a pre-defined prior distribution $p(\xi)$ according to $\xi \sim p(\xi)$. In some examples, $p(\xi)$ can be a Gaussian $$\mathcal{N}(0, \sigma_{mem}^2 I).$$

In some examples, $\sigma_{mem}$ can be a small $\sigma_{mem}>0$. Because $\tilde{h}^n$ is computed using $h^{n-1}$ and a noisy latent representation $z^n+\xi$, the system can train the model to be robust to errors. The system can also reduce the train-test discrepancy between the memory vector computed at training and inference, leading to improved performance at inference.

The system can generate a training denoising output (step 412). The system can generate the training denoising output from the corresponding training input by processing a training intermediate input that includes the corresponding training input using the latent denoising neural network in accordance with current values of the parameters of the latent denoising neural network.

For each corresponding training input other than a first corresponding training input, the training intermediate input can include the training memory vector.

In some examples, the training intermediate input can include the training conditioning signal.

The system determines updates to the parameters of the latent denoising neural network that optimize a training objective (step 414). For example, the training objective can measure an error between the corresponding ground-truth latent representation and a denoised representation generated using the training denoising output for an iteration t of the diffusion process.

As an example, the training objective can be described by $$\mathbb{E}_{(x_0,c),\epsilon,t,n}\left[\lambda(t)\left\|D_\theta\left(z_t^{n+1}, t; h^n, c\right) - z_0\right\|_2^2\right],$$

where $(x_0, c)$ is sampled from a dataset of temporal sequences $\mathcal{D}$, $$\epsilon \sim p(\epsilon),\ t \sim [1, T],\ \text{and}\ n \sim p(n).z_t^{n+1}$$

is the corresponding training input for the n+1-th segment that is generated by combining $\epsilon$ with the corresponding ground-truth latent representation $z_0$ for the n+1-th segment in accordance with t.

$$D_\theta\left(z_t^{n+1}, t; h^n, c\right)$$

represents the denoised representation generated using the training denoising output for the corresponding training input $$z_t^{n+1}.$$

$\epsilon$ is noise sampled from a pre-defined prior distribution $p(\epsilon)$. In some examples, $p(\epsilon)$ is a progressively correlated Gaussian distribution, which can allow for the mitigation of error accumulation. n is sampled from the pre-defined prior distribution p(n). In some examples, p(n) is set as p(0)=½ and p(n)=½(N−1) for n>0, as generating sequences of data elements without memory (i.e., n=0) is more difficult than continuation with a given memory vector (i.e., n>0). $\lambda(t)$ is a weighting function that can be used to emphasize certain diffusion timesteps during training.

In implementations where the system adds noise to the memory vector to generate a noisy memory vector $\tilde{h}^n$, the training objective function can be described by $$\mathcal{L}(\theta) := \mathbb{E}_{(x_0,c),\epsilon,t,n}\left[\lambda(t)\left\|D_\theta\left(z_t^{n+1}, t; \tilde{h}^n, c\right) - z_0\right\|_2^2\right].$$

In the example training objectives above, the stop-grad operation is not applied to $h^n$. That is, during the backward pass, gradients flow back through $h^n$ to update the parameters of the latent denoising neural network so that the latent denoising neural network learns to denoise latent representations that are consistent with the memory vector.

In some examples, the system can train the decoder neural network, the encoder neural network, or both. In some examples, the decoder neural network, the encoder neural network, or both, can be trained and frozen prior to the training of the latent denoising neural network.

In some examples, the decoder neural network and the encoder neural network are part of an autoencoder. In examples where the temporal sequence generation system generates videos, the autoencoder can be trained to reconstruct videos derived from a training set of videos. In some examples, each video can represent a segment of a longer video.

For example, the autoencoder can be trained to optimize one or more of a pixel-level reconstruction loss (e.g., mean-squared error), perceptual loss, or adversarial loss. In some examples, the autoencoder can be trained with a combination, e.g., sum, of the pixel-level reconstruction loss, perceptual loss, and adversarial loss.

Figure 5B:
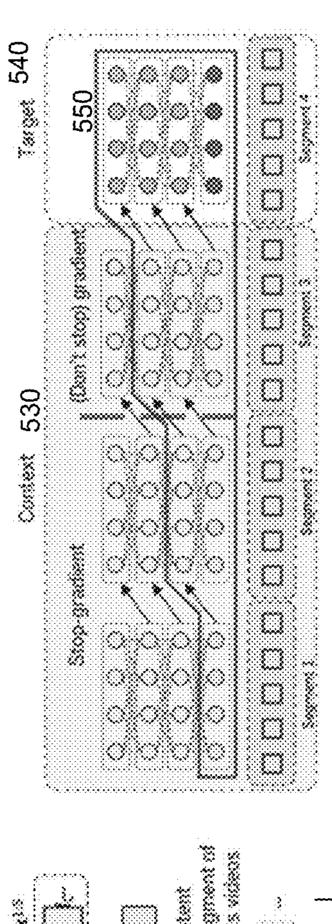
FIG. 5B shows an example process for training an example temporal sequence generation system.
Figure 5A:
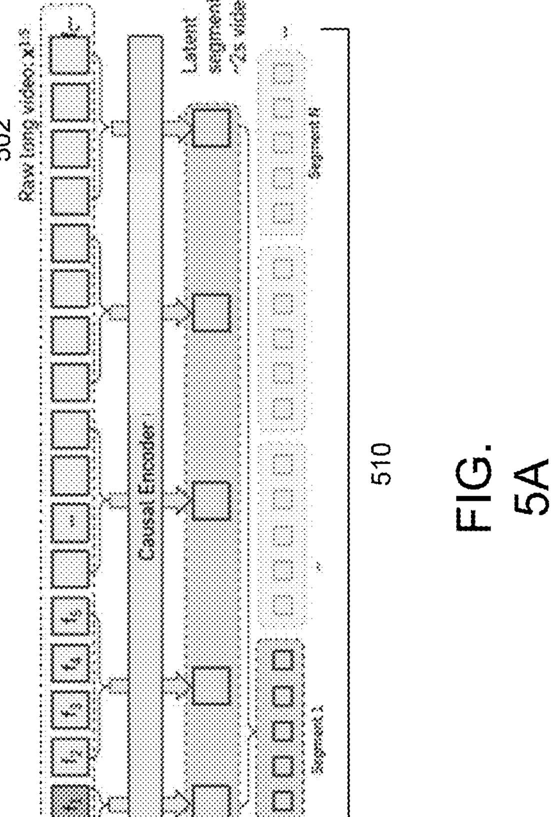
FIG. 5A shows an example process for generating a sequence of latent representations for a temporal sequence.

FIG. 5A shows an example process for generating a sequence of latent representations for a temporal sequence. FIG. 5A shows the generation of a latent representation for each of multiple segments 510 for a video 502.

In the example of FIG. 5A the video 502 includes S frames and has a size of $x^{1:S} \in \mathbb{R}^{S \times H \times W \times 3}$ with a resolution H×W. The system divides the video into N segments 510 of length $L: x^{(i-1)L+1:iL}$ for 1≤i≤N.

To generate the latent representations, the system encodes the video frames using an encoder, e.g., a causal encoder of an autoencoder. In some examples, the system can encode the video in chunks of m<N continuous segments at a time. For example, for 1≤i≤N/m, the system can encode $x^{(i-1)mL+1:imL}$ as a latent representation $z^{im:(i+1)m}$. In some examples, the encoder can map the video segments to their corresponding latent representations with a spatial downsampling factor $d_s$=H/h=W/w>1 and a temporal downsampling factor $d_t$=L/l>1. The system can thus use the latent representations 510 $z^1, \ldots, z^n$ of the video 502 for modeling the video distribution.

The system can use one or more of the latent representations in a training example for training a latent denoising neural network.

FIG. 5B shows an example process for training an example latent denoising neural network. For example, the system can train the latent denoising neural network to autoregressively generate latent representations. The system can model the joint distribution of latent segments as $$p(z^{1:L}|c) = \prod_{n=0}^{N-1} p(z^{n+1}|z^{1:n}, c)$$

with $z^{1:0}$:=0. The system can train the latent denoising neural network to learn all $p(z^{n+1}|z^{1:n}, c)$ for $0 \le n \le N-1$.

As described above with reference to FIG. 4, rather than using $z^{1:n}$ directly as a condition to the latent denoising neural network, the system can use a memory vector to encode the context. In the example of FIG. 5B, the latent denoising neural network generates the target latent representation 540 for segment 4 conditioned on the context 530, which represents segments 1-3.

FIG. 5B shows the increased receptive field 550 of the latent denoising neural network relative to a single segment. By encoding past segments using the memory vector as described in this specification, the system can enable autoregressive generation of segments of videos conditioned on the memory vector. The system can thus act as a diffusion model for generating videos conditioned on at least the memory vector, as well as an encoder to encode previous context of the video as a memory vector.

Figure 6:
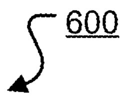
FIG. 6 shows the performance of an example temporal sequence generation system.

FIG. 6 shows the performance of an example temporal sequence generation system. In particular, the FIG. 6 shows the performance of a variety of techniques on video generation tasks in terms of Frechet Video Distance (FVD), Peak signal-to-noise ratio (PSNR), structural similarity index measure (SSIM), and a perceptual metric (LPIPS), which are metrics for evaluating the quality of generated videos.

As can be seen from table 600, the temporal sequence generation system described in this specification (labeled as "MALT") outperforms other video generation techniques on FVD (lower is better) for the unconditional video generation task with a length of 128 frames.

As can be seen from table 650, the temporal sequence generation system described in this specification outperforms other video generation techniques on FVD (lower is better), PSNR (higher is better), SSIM (higher is better), and LPIPS (lower is better) for the conditional video generation task of predicting 80 frames conditioned on 20 frames. In particular, MALT outperforms the TECO technique, despite having approximately half the number of parameters. This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a key vectorboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

This specification also includes the following clauses:

Clause 1. A computer-implemented method of generating an output temporal sequence of data elements conditioned on an input, the method comprising: obtaining the input, wherein the input comprises a noise input comprising a respective latent representation for each of a plurality of segments of the temporal sequence, each segment comprising one or more data elements of the output temporal sequence of data elements; updating, for each segment, the latent representation for the segment using a latent denoising neural network, wherein the latent denoising neural network is configured to autoregressively update the latent representations for each segment, the updating comprising, for each segment other than the first segment: obtaining a memory vector representing one or more hidden states generated by the latent denoising neural network when updating the latent representations for one or more preceding segments; updating the latent representation for the segment at each of a plurality of iterations, wherein the updating comprises, at each iteration: processing an intermediate input for the iteration comprising the latent representation and the memory vector to generate a denoising output; and updating the latent representation using the denoising output for the iteration; and generating the output temporal sequence of data elements by processing the latent representations for the plurality of segments using a decoder neural network.

Clause 2. The method of any preceding clause, wherein each hidden state is derived from one or more outputs of one or more layers of the latent denoising neural network generated when updating a preceding latent representation.

Clause 3. The method of any preceding clause, wherein obtaining the memory vector representing the one or more hidden states comprises: generating a respective encoding for the one or more hidden states.

Clause 4. The method of any preceding clause, wherein the latent denoising neural network is configured to apply attention over the memory vector and the latent representation with keys and values derived from the memory vector and queries derived from the latent representation.

Clause 5. The method of clause 4, wherein the latent denoising neural network is configured to apply attention using relative positional encoding between the keys and queries.

Clause 6. The method of any preceding clause, wherein the latent denoising neural network is further configured to apply self-attention over the latent representation with keys, values, and queries derived from tokens that represent a same data element of the segment represented by the latent representation.

Clause 7. The method of any preceding clause, wherein the latent denoising neural network is further configured to apply self-attention over the latent representation with keys, values, and queries derived from tokens that represent two or more data elements of the segment represented by the latent representation.

Clause 8. The method of any preceding clause, wherein the input further comprises a conditioning signal, and wherein the latent denoising neural network is further configured to apply attention over the conditioning signal and the latent representation with keys and values derived from the conditioning signal and queries derived from the latent representation.

Clause 9. The method of any preceding clause, wherein obtaining the input comprises sampling the noise input from a noise distribution.

Clause 10. The method of any preceding clause, wherein the input further comprises a conditioning signal, and wherein the intermediate input further comprises the conditioning signal.

Clause 11. The method of any preceding clause, wherein the method further comprises representing each of the latent representations as a respective sequence of embeddings, each representing a respective patch of the latent representation.

Clause 12. The method of clause 11, wherein representing each of the latent representations as a respective sequence of embeddings comprises, for each latent representation: generating a respective patch embedding for each respective patch of the latent representation; generating one or more corresponding positional embeddings for each of the respective patch embeddings; and generating the respective sequence of embeddings by combining, for each respective patch embedding, the respective patch embedding and the one or more corresponding positional embeddings.

Clause 13. The method of clause 12, wherein the one or more positional embeddings are derived from spatial positional embeddings and temporal positional embeddings.

Clause 14. The method of any preceding clause, wherein the decoder neural network has been trained and frozen prior to the training of the latent denoising neural network.

Clause 15. The method of any preceding clause, wherein the latent denoising neural network has been trained by repeatedly: obtaining a training example comprising (i) a respective training temporal sequence of data elements comprising a plurality of training data elements and (ii) a training conditioning signal; generating, from the training temporal sequence of data elements, a respective sequence of a plurality of training segments, each training segment comprising a consecutive subset of one or more training data elements; generating, for each training segment, a corresponding ground-truth latent representation using an encoder neural network; adding noise to each corresponding ground-truth latent representation to create a corresponding training input; for each corresponding training input: for each corresponding training input other than a first corresponding training input, obtaining a training memory vector representing a respective hidden state for one or more preceding corresponding training inputs; generating a training denoising output from the corresponding training input by processing a training intermediate input comprising the corresponding training input using the latent denoising neural network in accordance with current values of the parameters of the latent denoising neural network; and determining updates to the parameters of the latent denoising neural network that optimize a training objective.

Clause 16. The method of clause 15, wherein the training objective measures an error between the corresponding ground-truth latent representation and a denoised representation generated using the training denoising output.

Clause 17. The method of any of clauses 15-16, wherein for each corresponding training input other than a first corresponding training input, the training intermediate input further comprises the training memory vector.

Clause 18. The method of clause 15, wherein each hidden state is derived from one or more outputs of one or more layers of the latent denoising neural network generated when processing the corresponding ground-truth latent representation for a preceding training segment conditioned on frozen memory vectors for any preceding training segments for the preceding training segment.

Clause 19. The method of clause 18, further comprising adding noise to the corresponding ground-truth latent representation.

Clause 20. The method of any preceding clause, wherein the output temporal sequence of data elements is a video, and wherein each data element is a video frame.

Clause 21. The method of clause 20, wherein the input comprises a conditioning signal, and wherein the conditioning signal comprises an embedding of text describing the output video.

Clause 22. The method of any of clauses 20-21, wherein the decoder neural network is configured to generate one or more video frames given a latent representation for the one or more video frames.

Clause 23. A system comprising one or more computers and one or more storage devices storing instructions that are operable, when executed by the one or more computers, to cause the one or more computers to perform the operations of the respective method of any of clauses 1-22.

Clause 24. A computer storage medium encoded with instructions that, when executed by one or more computers, cause the one or more computers to perform the operations of the respective method of any of clauses 1-22.

What is claimed is:

1. A computer-implemented method of generating an output temporal sequence of data elements conditioned on an input, the method comprising:

obtaining the input, wherein the input comprises a noise input comprising a respective latent representation for each of a plurality of segments of the temporal sequence, each segment comprising one or more data elements of the output temporal sequence of data elements;

updating, for each segment, the latent representation for the segment using a latent denoising neural network, wherein the latent denoising neural network is configured to autoregressively update the latent representations for each segment, the updating comprising, for each segment other than the first segment:

obtaining a memory vector representing one or more hidden states generated by the latent denoising neural network when updating the latent representations for one or more preceding segments;

updating the latent representation for the segment at each of a plurality of iterations, wherein the updating comprises, at each iteration:

processing an intermediate input for the iteration comprising the latent representation and the memory vector to generate a denoising output; and updating the latent representation using the denoising output for the iteration; and generating the output temporal sequence of data elements by processing the latent representations for the plurality of segments using a decoder neural network.

2. The method of claim 1, wherein each hidden state is derived from one or more outputs of one or more layers of the latent denoising neural network generated when updating a preceding latent representation.

3. The method of claim 1, wherein the latent denoising neural network is configured to apply attention over the memory vector and the latent representation with keys and values derived from the memory vector and queries derived from the latent representation.

4. The method of claim 3, wherein the latent denoising neural network is configured to apply attention using relative positional encoding between the keys and queries.

5. The method of claim 1, wherein the latent denoising neural network is further configured to apply self-attention over the latent representation with keys, values, and queries derived from tokens that represent a same data element of the segment represented by the latent representation.

6. The method of claim 1, wherein the latent denoising neural network is further configured to apply self-attention over the latent representation with keys, values, and queries derived from tokens that represent two or more data elements of the segment represented by the latent representation.

7. The method of claim 1, wherein the input further comprises a conditioning signal, and wherein the latent denoising neural network is further configured to apply attention over the conditioning signal and the latent representation with keys and values derived from the conditioning signal and queries derived from the latent representation.

8. The method of claim 1, wherein the input further comprises a conditioning signal, and wherein the intermediate input further comprises the conditioning signal.

9. The method of claim 1, wherein the method further comprises representing each of the latent representations as a respective sequence of embeddings, each representing a respective patch of the latent representation.

10. The method of claim 9, wherein representing each of the latent representations as a respective sequence of embeddings comprises, for each latent representation:

generating a respective patch embedding for each respective patch of the latent representation;

generating one or more corresponding positional embeddings for each of the respective patch embeddings; and generating the respective sequence of embeddings by combining, for each respective patch embedding, the respective patch embedding and the one or more corresponding positional embeddings.

11. The method of claim 1, wherein the latent denoising neural network has been trained by repeatedly:

obtaining a training example comprising (i) a respective training temporal sequence of data elements comprising a plurality of training data elements and (ii) a training conditioning signal;

generating, from the training temporal sequence of data elements, a respective sequence of a plurality of training segments, each training segment comprising a consecutive subset of one or more training data elements;

generating, for each training segment, a corresponding ground-truth latent representation using an encoder neural network;

adding noise to each corresponding ground-truth latent representation to create a corresponding training input;

for each corresponding training input:

for each corresponding training input other than a first corresponding training input, obtaining a training memory vector representing a respective hidden state for one or more preceding corresponding training inputs;

generating a training denoising output from the corresponding training input by processing a training intermediate input comprising the corresponding training input using the latent denoising neural network in accordance with current values of the parameters of the latent denoising neural network; and determining updates to the parameters of the latent denoising neural network that optimize a training objective.

12. The method of claim 11, wherein the training objective measures an error between the corresponding ground-truth latent representation and a denoised representation generated using the training denoising output.

13. The method of claim 11, wherein for each corresponding training input other than a first corresponding training input, the training intermediate input further comprises the training memory vector.

14. The method of claim 11, wherein each hidden state is derived from one or more outputs of one or more layers of the latent denoising neural network generated when processing the corresponding ground-truth latent representation for a preceding training segment conditioned on frozen memory vectors for any preceding training segments for the preceding training segment.

15. The method of claim 4, further comprising adding noise to the corresponding ground-truth latent representation.

16. The method of claim 1, wherein the output temporal sequence of data elements is a video, and wherein each data element is a video frame.

17. The method of claim 16, wherein the input comprises a conditioning signal, and wherein the conditioning signal comprises an embedding of text describing the output video.

18. The method of claim 16, wherein the decoder neural network is configured to generate one or more video frames given a latent representation for the one or more video frames.

19. A system comprising one or more computers and one or more storage devices storing instructions that are operable, when executed by the one or more computers, to cause the one or more computers to perform operations for generating an output temporal sequence of data elements conditioned on an input, the operations comprising:

obtaining the input, wherein the input comprises a noise input comprising a respective latent representation for each of a plurality of segments of the temporal sequence, each segment comprising one or more data elements of the output temporal sequence of data elements;

updating, for each segment, the latent representation for the segment using a latent denoising neural network, wherein the latent denoising neural network is configured to autoregressively update the latent representations for each segment, the updating comprising, for each segment other than the first segment:

obtaining a memory vector representing one or more hidden states generated by the latent denoising neural network when updating the latent representations for one or more preceding segments;

updating the latent representation for the segment at each of a plurality of iterations, wherein the updating comprises, at each iteration:

processing an intermediate input for the iteration comprising the latent representation and the memory vector to generate a denoising output; and updating the latent representation using the denoising output for the iteration; and generating the output temporal sequence of data elements by processing the latent representations for the plurality of segments using a decoder neural network.

20. A computer storage medium encoded with instructions that, when executed by one or more computers, cause the one or more computers to perform operations for generating an output temporal sequence of data elements conditioned on an input, the operations comprising:

obtaining the input, wherein the input comprises a noise input comprising a respective latent representation for each of a plurality of segments of the temporal sequence, each segment comprising one or more data elements of the output temporal sequence of data elements;

updating, for each segment, the latent representation for the segment using a latent denoising neural network, wherein the latent denoising neural network is configured to autoregressively update the latent representations for each segment, the updating comprising, for each segment other than the first segment:

obtaining a memory vector representing one or more hidden states generated by the latent denoising neural network when updating the latent representations for one or more preceding segments;

updating the latent representation for the segment at each of a plurality of iterations, wherein the updating comprises, at each iteration:

processing an intermediate input for the iteration comprising the latent representation and the memory vector to generate a denoising output; and updating the latent representation using the denoising output for the iteration; and generating the output temporal sequence of data elements by processing the latent representations for the plurality of segments using a decoder neural network.

* * * * *